United States Patent [19]
Erskine

[11] Patent Number: 5,872,628
[45] Date of Patent: *Feb. 16, 1999

[54] NOISE PAIR VELOCITY AND RANGE ECHO LOCATION SYSTEM

[75] Inventor: David J. Erskine, Oakland, Calif.

[73] Assignee: The Regents of the University of California, Oakland, Calif.

[*] Notice: The term of this patent shall not extend beyond the expiration date of Pat. No. 5,642,194.

[21] Appl. No.: 720,343

[22] Filed: Sep. 27, 1996

[51] Int. Cl.$^6$ ........................................................ G01B 9/02
[52] U.S. Cl. ........................ 356/345; 356/28.5; 356/349; 356/4.09
[58] Field of Search ............................... 356/4.09, 28.5, 356/349, 345

[56] References Cited

U.S. PATENT DOCUMENTS 5,642,194  6/1997  Erskine ................................ 356/345

*Primary Examiner*—Robert Kim
*Attorney, Agent, or Firm*—John P. Wooldridge

[57] ABSTRACT

An echo-location method for microwaves, sound and light capable of using incoherent and arbitrary waveforms of wide bandwidth to measure velocity and range (and target size) simultaneously to high resolution. Two interferometers having very long and nearly equal delays are used in series with the target interposed. The delays can be longer than the target range of interest. The first interferometer imprints a partial coherence on an initially incoherent source which allows autocorrelation to be performed on the reflected signal to determine velocity. A coherent cross-correlation subsequent to the second interferometer with the source determines a velocity discriminated range. Dithering the second interferometer identifies portions of the cross-correlation belonging to a target apart from clutter moving at a different velocity. The velocity discrimination is insensitive to all slowly varying distortions in the signal path. Speckle in the image of target and antenna lobing due to parasitic reflections is minimal for an incoherent source. An arbitrary source which varies its spectrum dramatically and randomly from pulse to pulse creates a radar elusive to jamming. Monochromatic sources which jigger in frequency from pulse to pulse or combinations of monochromatic sources can simulate some benefits of incoherent broadband sources. Clutter which has a symmetrical velocity spectrum will self-cancel for short wavelengths, such as the apparent motion of ground surrounding target from a sidelooking airborne antenna.

26 Claims, 20 Drawing Sheets

PAIR IMPULSE RESPONSE

N-TUPLET IMPULSE RESPONSE

BEFORE TRANSMITTING INTERFEROMETER 22

AFTER TRANSMITTING INTERFEROMETER 22

AFTER TARGET 24

AFTER RECEIVING INTERFEROMETER 23

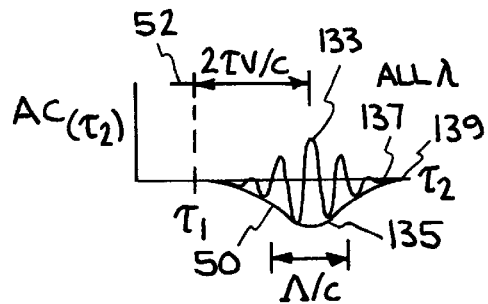
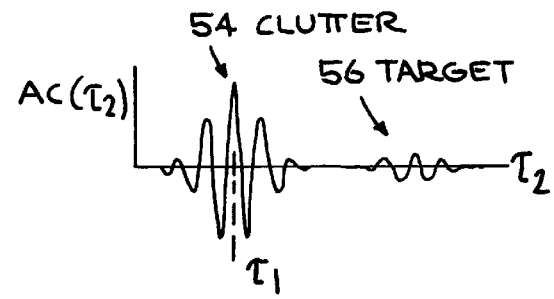
FIG. 3A  FIG. 3B
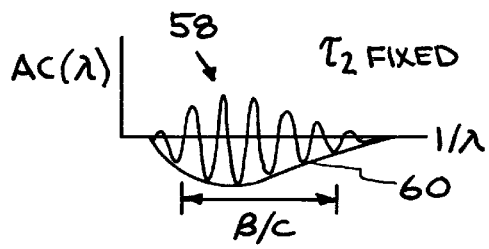
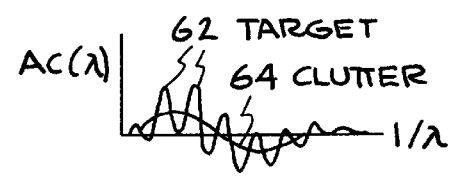
FIG. 3C  FIG. 3D
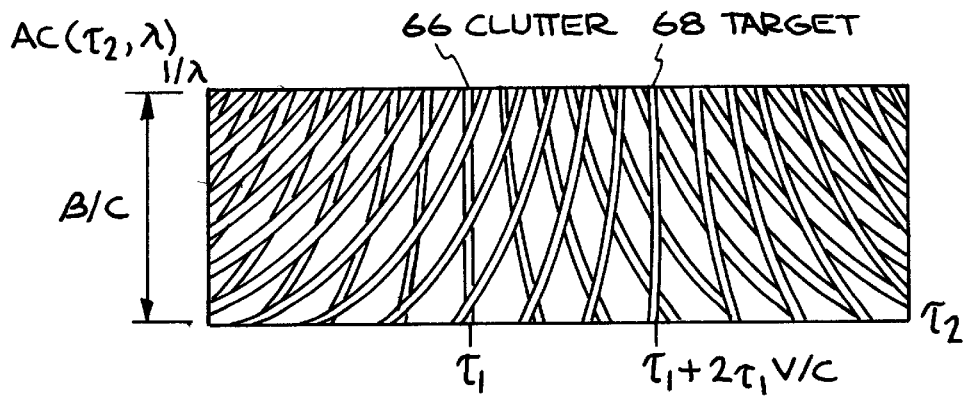
FIG. 3E

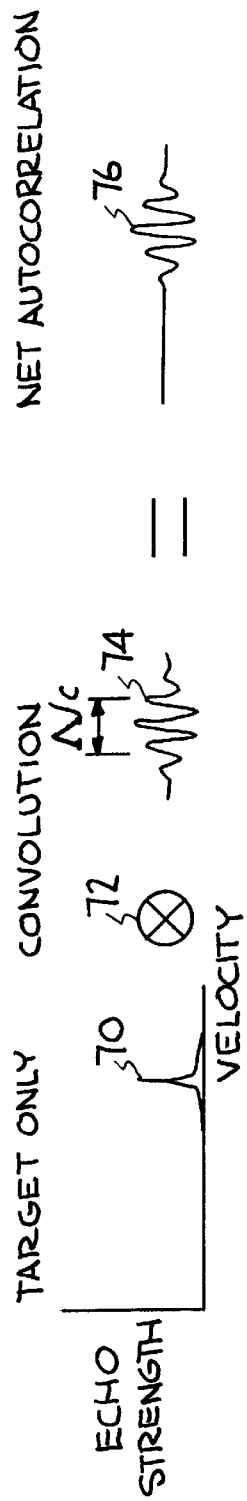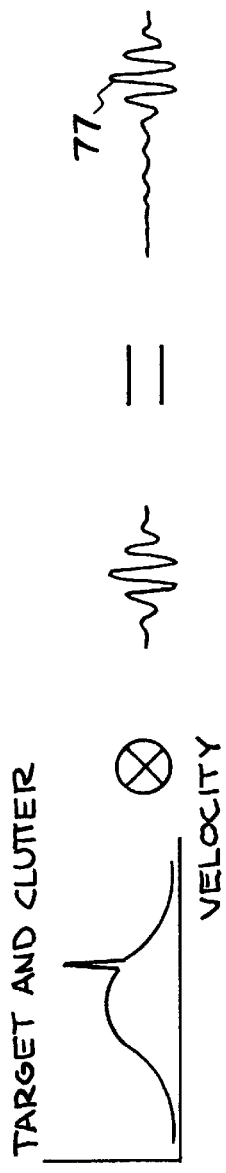
FIG. 4A
FIG. 4B
FIG. 4C

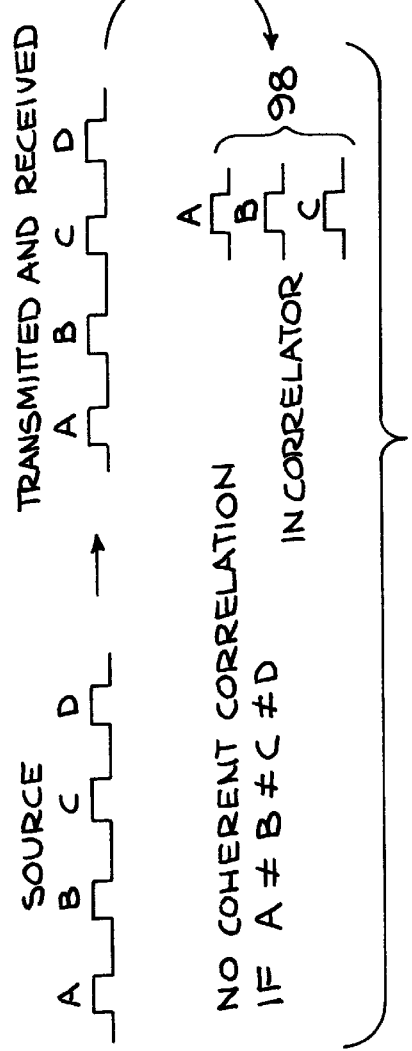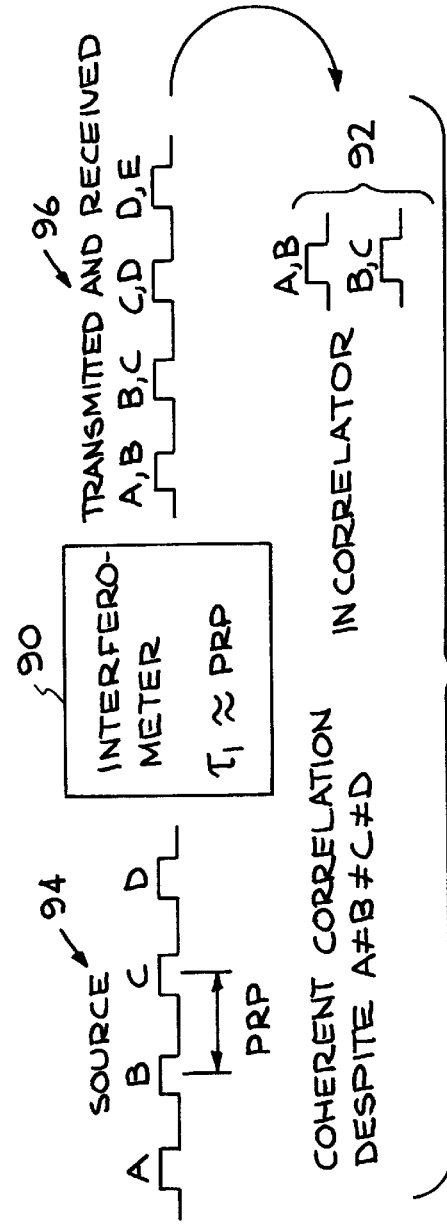

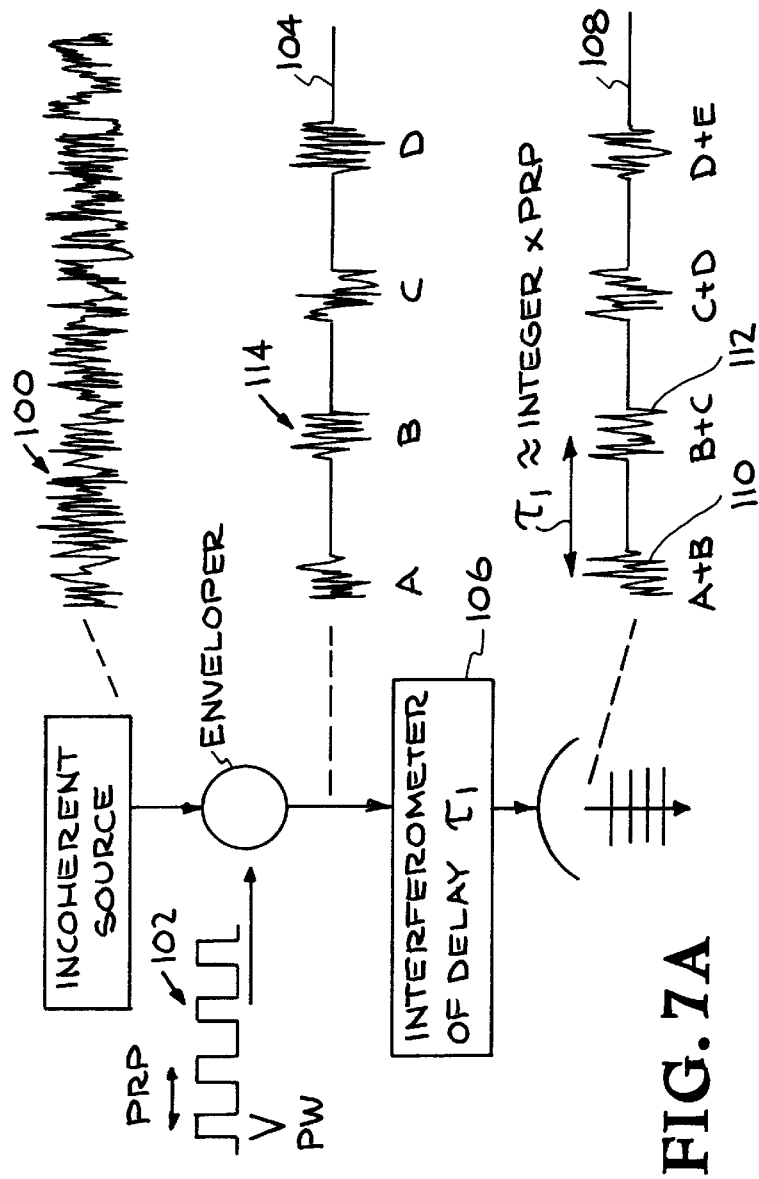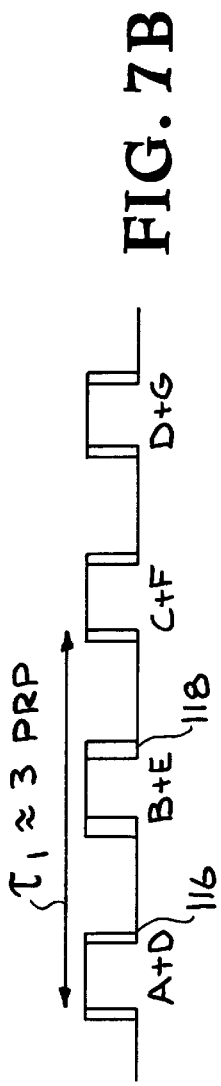
FIG. 7A
FIG. 7B

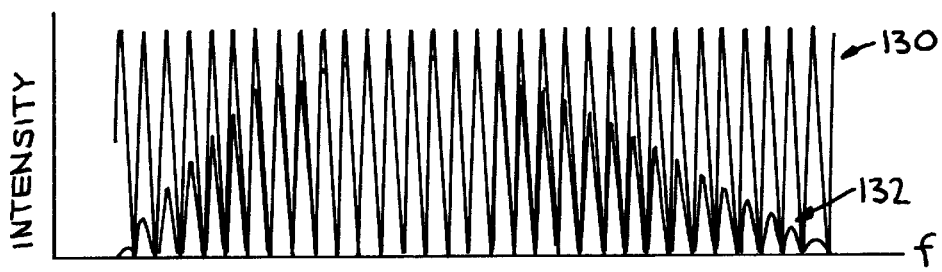
FIG. 9A
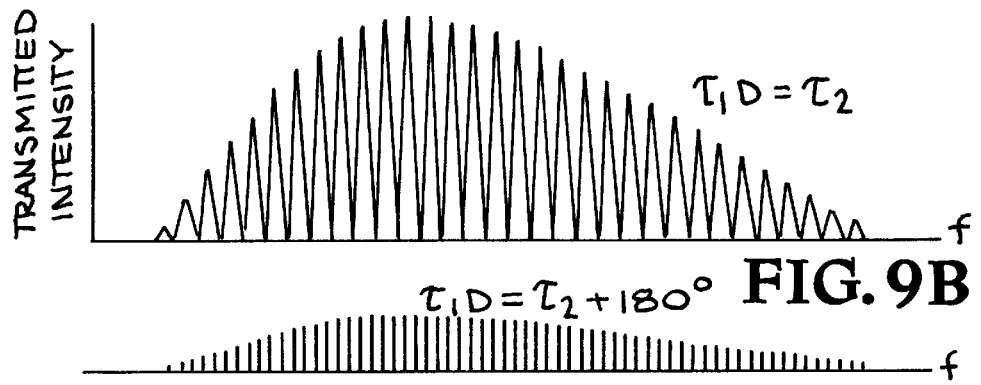
FIG. 9B
FIG. 9C
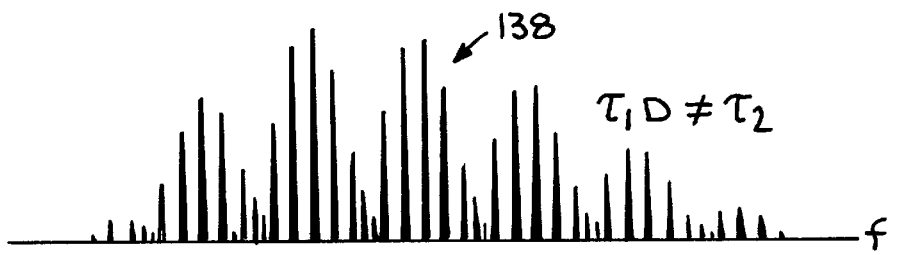
FIG. 9D
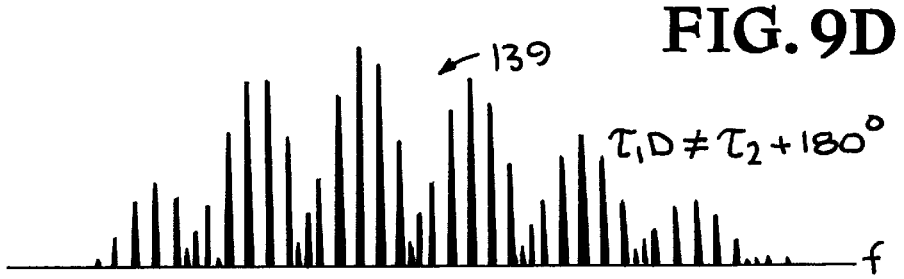
FIG. 9E

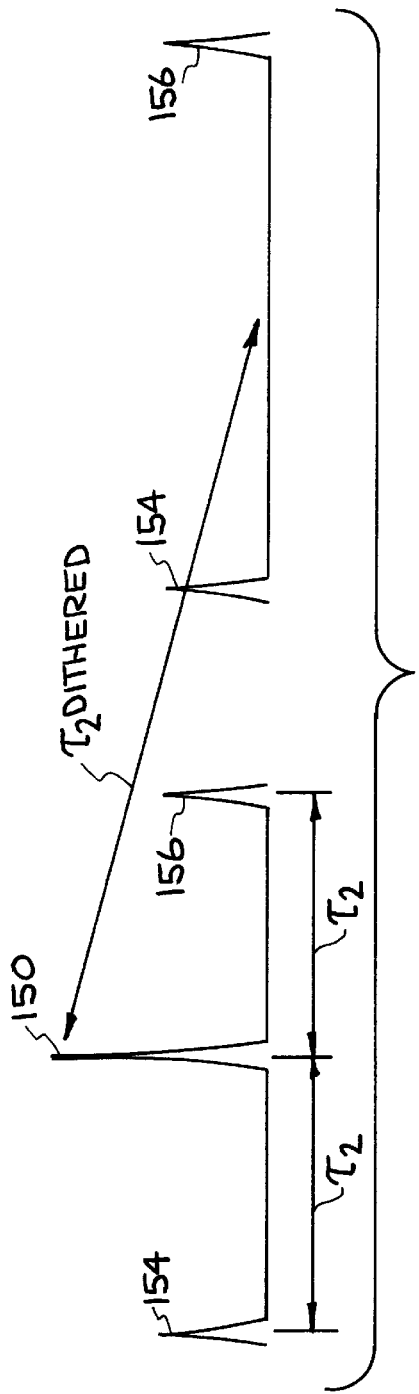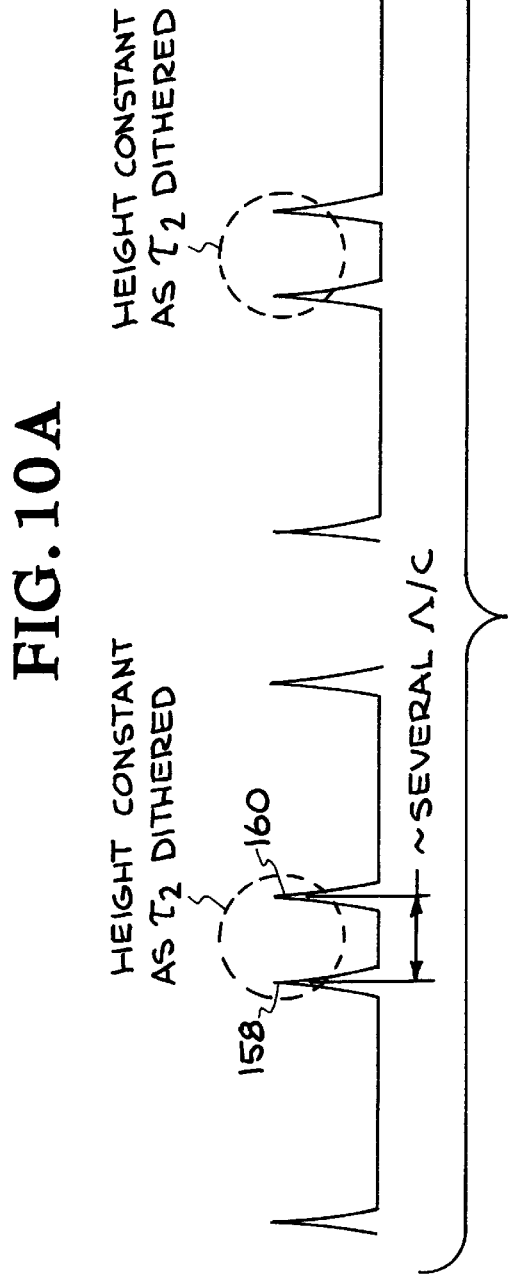
FIG. 10A
FIG. 10B

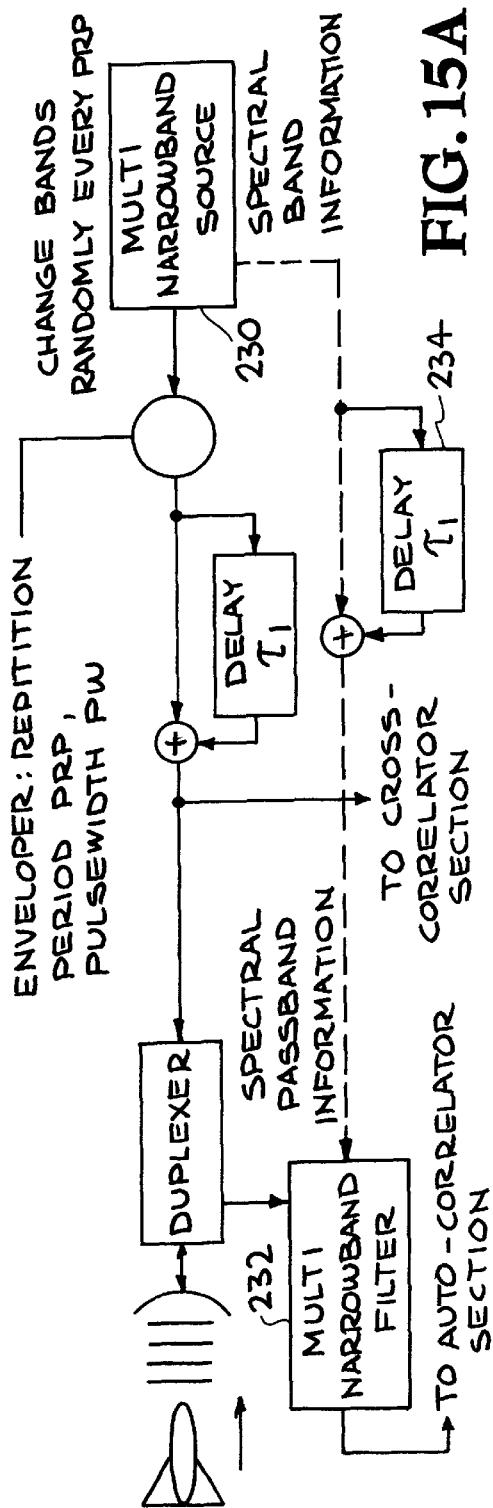
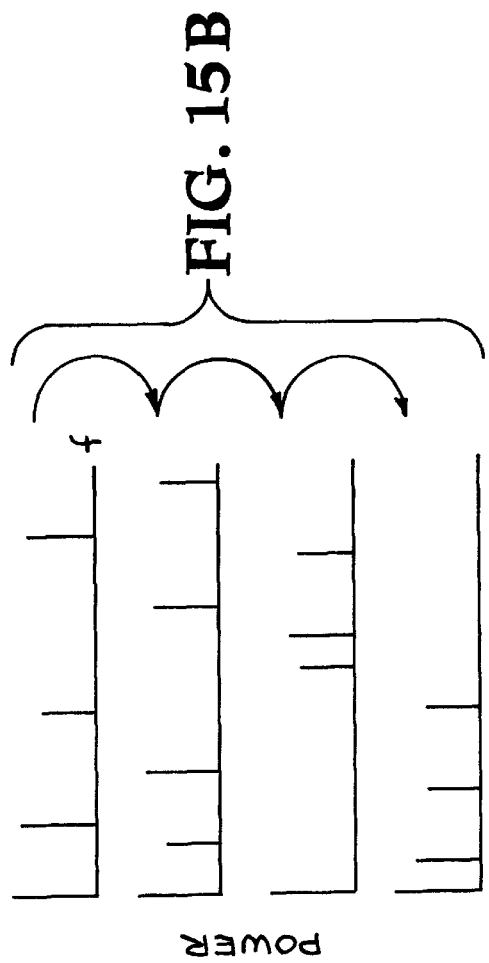
FIG. 15A
FIG. 15B

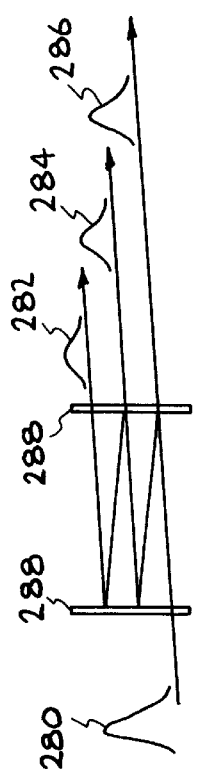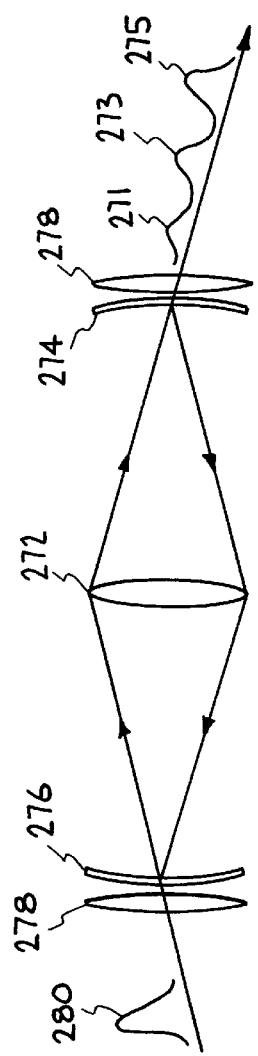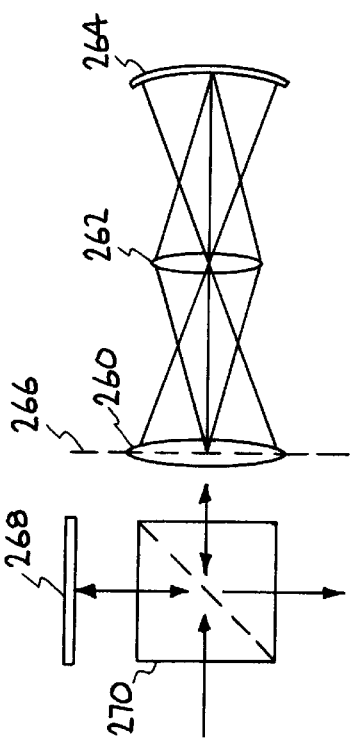

NOISE PAIR VELOCITY AND RANGE ECHO LOCATION SYSTEM

The United States Government has rights in this invention pursuant to Contract No. W-7405-ENG-48 between the United States Department of Energy and the University of California for the operation of Lawrence Livermore National Laboratory.

BACKGROUND

1. Field of the Technology

The present invention relates to the simultaneous measurement of target velocity and position by microwaves (radar), sound (sonar and ultrasound) and light, and more specifically, it relates to the use of long delay interferometric techniques, short coherence length illumination and the Doppler effect to measure velocity and range.

2. Description of the Background

Measuring the velocity and range of an object remotely by the response of reflected waves (microwaves, light and sound) is an important diagnostic tool in a variety of fields in science and engineering. In many cases, the velocimetry and range finding are accomplished by opposite kinds of illuminating waves. Traditionally, highly coherent and therefore narrowbanded illumination is used for velocimetry, so that the Doppler frequency shift in the reflected waves is larger than the illumination bandwidth $\beta$. This allows the Doppler frequencies of moving targets to be easily distinguished from those of stationary objects by the use of narrowbanded filters. In contrast, for range finding a short coherence length $\Lambda$ is desired, since half the coherence length defines the range resolution. A short coherence length implies broadband illumination because of the reciprocal relationship $\Lambda \sim c/\beta$, where c is the speed of the waves. Thus, illumination optimized for conventional velocimetry is very different from that optimized for range finding.

For example, monochromatic laser illumination is conventionally used for optical velocimetry, whereas broadband and incoherent light such as white light is used for rangefinding, which in optics is called optical coherence tomography. Pulse Doppler radars are used for velocimetry having monochromatic waves enveloped into ~1 µs pulses. The range resolution of these is limited by the ~300 meter pulse envelope length. In contrast, range finding or mapping radars use illumination having a much shorter coherence length. This is often achieved by increasing the bandwidth of the waveform through frequency modulation or the repetitive use of a coded pulse to simulate randomness.

A theoretical optimum waveform for many range finding applications is wideband and incoherent, analogous to white light generated by incandescence. For radar and sonar this could be generated by an electronic noise source. A truly incoherent waveform is random and therefore never repeats. This is an advantage because any speckle or temporary coherences in the echolocation target image is blurred away, improving the observation of detail. Incoherent illumination will not suffer the interference effect between the transmitted beam and parasitic reflections from the Earth, thus minimizing the lobed characteristics of antennas in the altitude direction. A further advantage of incoherent illumination over a short pulse or frequency modulated pulse having the same coherence length is that a random waveform can be arbitrarily long without repetition. That is, its time-bandwidth product can be arbitrarily large. The longer pulse carries correspondingly more energy to the target, which increases the maximum range of detection.

An important desirable trait of echolocation systems is the ability to measure velocity and range simultaneously to high resolution. In radar, the velocity resolution is used to separate moving targets from ground clutter. Once detected, the range and if possible, the size of the target is desired to be known. In medical ultrasound, the motion of the blood can distinguish blood vessels from surrounding tissues. A map of the vessels having high spatial resolution and color coded by velocity is the goal of these devices.

Measuring the velocity and range simultaneously to high resolution is possible by measuring the range to high resolution at two different, but well defined times and finding the rate of change. This is accomplished in some radars using short coherence waves and by cross correlating the reflected and transmitted signals. A disadvantage with a cross-correlation is that distortions in the waves suffered anywhere between the transmitter and receiver can broaden the cross-correlation peak, and hence can blur the velocity determination. Such distortions could include distortions in the final stages of the transmitting amplifier, the effect of propagation through the atmosphere, the target albedo spectrum such as resonances, and reverberations from previous pings.

A different method for determining velocity is the autocorrelation. This is a comparison of the received signal with itself delayed by a time $\tau_2$. For those waveforms which produce an autocorrelation peak, the peak shifts with velocity v by an amount $\Delta\tau_2 = 2\tau_2 v/c$. The advantage of the autocorrelation is that it will not broaden by slowly varying distortions, which includes many practical distortions. Thus the autocorrelation will give an accurate velocity under distortions that would cause a cross-correlation to blur.

The problem is that autocorrelations cannot be used with the most desirable illumination, perfectly random and ever changing waveforms, because these waveforms are by definition incoherent over all delay scales. The method of the present invention is a solution to this problem. In addition to velocimetry using incoherent illumination, the invention is capable of measuring range and velocity simultaneously to high resolution, providing a way to discriminate moving targets from background clutter.

SUMMARY OF THE INVENTION

It is an object of the present invention to use an arbitrary waveform, which may be incoherent, to measure the range and velocity of a target by autocorrelating and cross-correlating the waves reflected from the target.

It is also an object of the present invention to provide a method to produce partially coherent illumination from arbitrary waveforms which could be incoherent.

Properties of the target which produce a dilation or contraction of the illuminating waveform can be measured by this method, where the illuminating beam can either reflect or pass through the target. For example, if the target consists of a region containing plasma, the time rate of change of the plasma density will dilate or contract the waveform of the reflected or transmitted illumination similar to the Doppler effect of a moving reflector.

A transmitter comprises a wave source, an interferometer having a delay $\tau_1$, and an antenna or transducer for sending the waves toward the target. The transmitting interferometer imprints the source with partial coherence for a very specific delay $\tau_1$, and uses this for illuminating the target. A receiver comprises an antenna or transducer for detecting the waves reflected from the target, and a second interferometer of delay $\tau_2$ nearly identical to $\tau_1$. The output of the receiving interferometer is converted to a time-averaged intensity which constitutes an autocorrelation. The autocorrelation can be interpreted to yield target velocity. The output of the receiving interferometer is also added to a copy of the source waveform, copied prior to the transmitting interferometer, and delayed in time by $\tau_3$ to form a combined signal. The time-averaged intensity of this combined signal versus $\tau_3$ constitutes a cross-correlation which gives range information. By slightly dithering the value of $(\tau_1-\tau_2)$, the portions of the cross-correlation associated with a target moving at a specific velocity will fluctuate synchronously with the dither. Thus the range of targets having specific velocities can be identified in the cross-correlation apart from other targets having different velocities. This allows a moving aircraft to be detected even though its radar reflections are overlapped by reflections from stationary ground clutter.

The transmitting interferometer allows the use of a incoherent source by imprinting a partial coherence to it, for a very specific delay value of $\tau_1$. On other lengths scales, the illumination sent to the target appears incoherent. Without the transmitting interferometer, the autocorrelation at the receiver would not produce a peak which can be interpreted into velocity, and the cross-correlation would not depend on the dither of $(\tau_1-\tau_2)$, so there would be no velocity discrimination in the range measurement.

By the use of a incoherent wideband source waveform, high range and velocity resolutions are achieved simultaneously due to the short illumination coherence length. Most of the randomness of the source is preserved in the imprinted waveform used for illumination. This randomness blurs any speckle in the cross-correlation due to temporary coherences. A random waveform delivers a large energy to the target without repeating. Repetition is avoided to reduce range and velocity ambiguities.

It is an object of the interferometers to produce from an applied waveform an output waveform consisting of an undelayed waveform and a finite number of delayed waveforms, called echos. The time separation between the undelayed and each of the delayed waveforms is defined the interferometer delay. The delayed and undelayed waveforms must be coherent replicas of each other. However, it is allowed that the undelayed and delayed waveforms differ from the applied waveform. That is, distortion is allowed in the interferometer mechanism provided the distortion affects undelayed and delayed waveforms equally. This allows inexpensive schemes to create the interferometer delays which may not treat all fequency components equally.

BRIEF DESCRIPTION OF THE DRAWINGS

FIG. 3A shows the autocorrelation signal for the full bandwidth versus receiving interferometer delay.

FIG. 3B shows the autocorrelation signal for the full bandwidth for two targets having different velocity.

FIG. 3C shows the autocorrelation at fixed delay versus frequency.

FIG. 3D shows the autocorrelation at fixed delay versus frequency for two targets having different velocity.

FIG. 3E shows a 2-D map of the maxima in the autocorrelation versus essentially frequency and delay for two targets having different velocities.

FIG. 4A shows the convolution between a narrow velocity distribution and a single velocity fringe impulse response.

FIG. 4B shows the convolution between a broad velocity distribution and a single velocity fringe impulse response.

FIG. 4C shows the combination of a narrow and broad velocity distribution and a single velocity fringe impulse response.

FIG. 6A shows the scheme in prior art for correlating pulses.

FIG. 6B shows the scheme of the present invention for correlating pulses.

FIG. 7A shows the enveloping of an incoherent waveform into periodic pulses.

FIG. 7B shows the effect of jiggering the interferometer delay relative to the pulse envelope period.

FIG. 9A shows the receiving comb filter compared against spectrum of wave from target.

FIG. 9B shows spectrum passing through receiving comb filter when receiving delay is set to anticipate target Doppler shift.

FIG. 9C shows spectrum passing through receiving comb filter when delay is incremented by half a fringe over FIG. 9B.

FIG. 9D shows spectrum passing through receiving comb filter when receiving delay is very mismatched to anticipated target Doppler shift.

FIG. 9E shows spectrum passing through receiving comb filter when delay is incremented by half a fringe over FIG. 9D.

FIG. 10A shows net impulse response of the transmitter and receiver interferometers in series when delays are matched for the target Doppler shift and one delay is dithered by half a fringe.

Figure 10B shows net impulse response of the transmitter and receiver interferometers in series when delays are grossly mismatched for the target Doppler shift and one delay is dithered by half a fringe.

FIG. 15A shows a scheme for using a randomly changing multiband narrowband source and filter to defeat enemy jamming.

FIG. 15B shows an example sequence of spectra for the scheme of FIG. 15A.

FIG. 18A illustrates the non-superimposing nature of a Fabry-Perot interferometer.

FIG. 18B illustrates an optical recirculating interferometer satisfying the superimposing condition.

FIG. 18C illustrates an optical two-path interferometer satisfying the superimposing condition.

DETAILED DESCRIPTION OF THE INVENTION

Figure 1A:
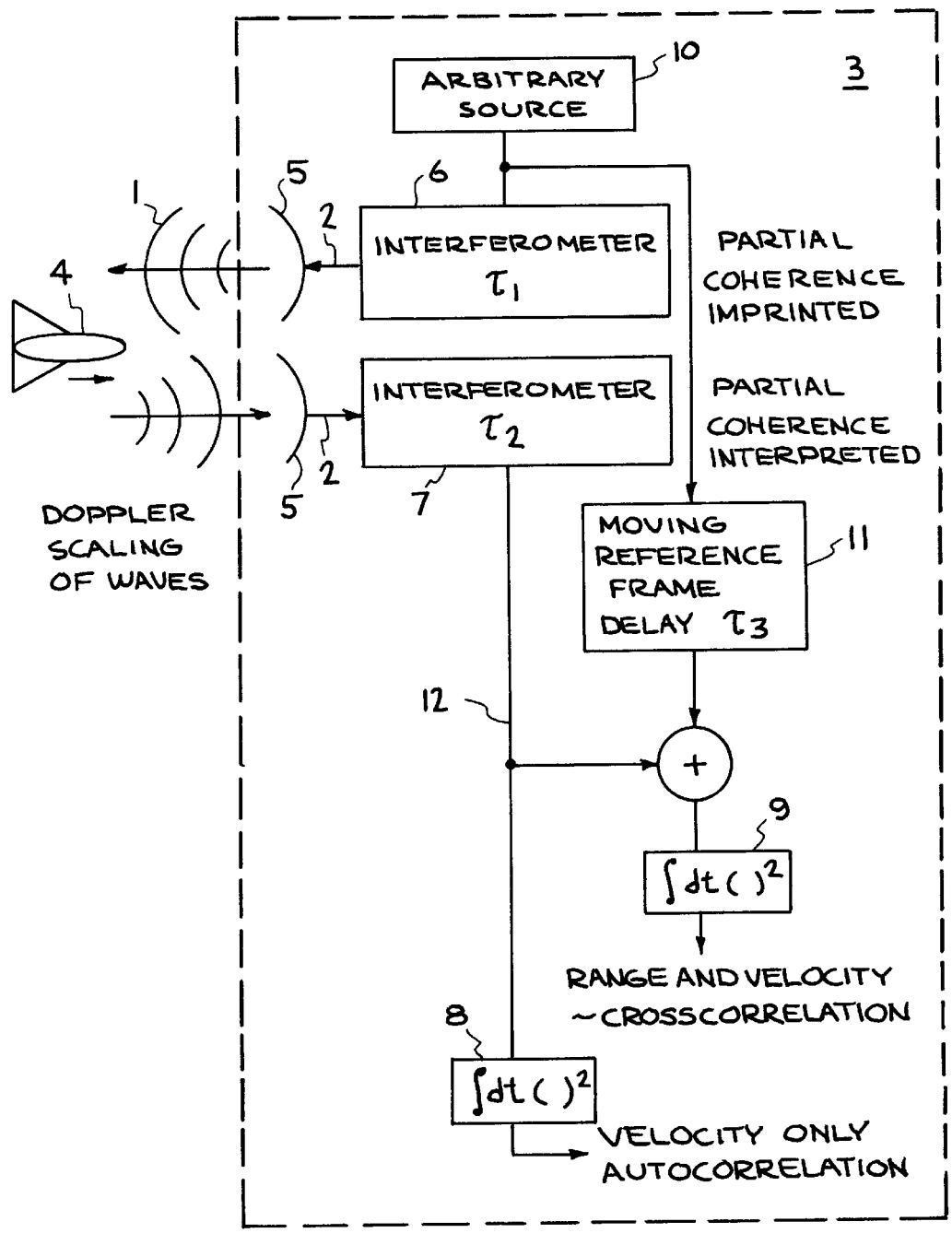
FIG. 1A illustrates a block diagram of the invention.

FIG. 1A shows an overview of the invention, consisting of a means for performing interferometry, autocorrelations and cross-correlations, called the apparatus 3, and a means 5 such as an antenna or transducer for converting the waves 1 propagating between the target 4 and apparatus into the waves 2 which will carry the information through the apparatus. The source 10 generates a waveform which can be nearly arbitrary, the exception described later. The preferred embodiment is for a wideband waveform having a very short coherence length $\Lambda$ and which is incoherent on all other length scales, and which is ever evolving in a random way so that speckle in the correlations are washed out over time.

The source passes through an interferometer 6, called the transmitting interferometer, which has a very long delay $\tau_1$ compared to $\Lambda$. A second interferometer, called the receiving interferometer 7 has a delay $\tau_2$ very nearly matched to $\tau_1$. The time averaged intensity 8 of the receiving interferometer output is equivalent to an autocorrelation. The transmitting interferometer imprints a partial coherence on the source waveform that allows the subsequent autocorrelation of the received signal to produce a peak at delays $\tau_2$ near $\tau_1$. The peak's shift determines the velocity. A cross-correlation 9 of the receiving interferometer output and the source yields range and velocity information. By dithering $\tau_2$, the portions of the cross-correlation corresponding to a moving target of a particular velocity can be distinguished from other objects having different velocities. Thus output 9 can be called a velocity discriminated range signal.

Figure 1B:
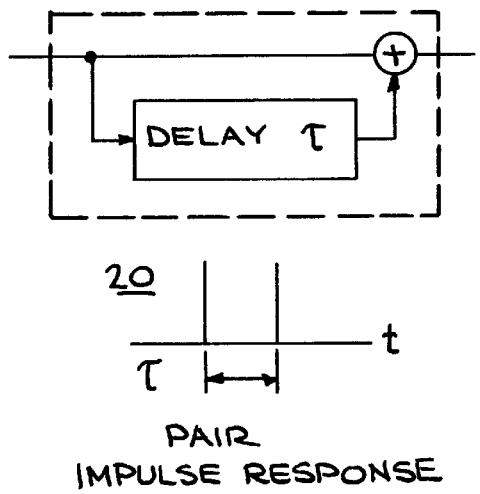
FIG. 1B illustrates a two-path interferometer concept and its impulse response.
Figure 1C:
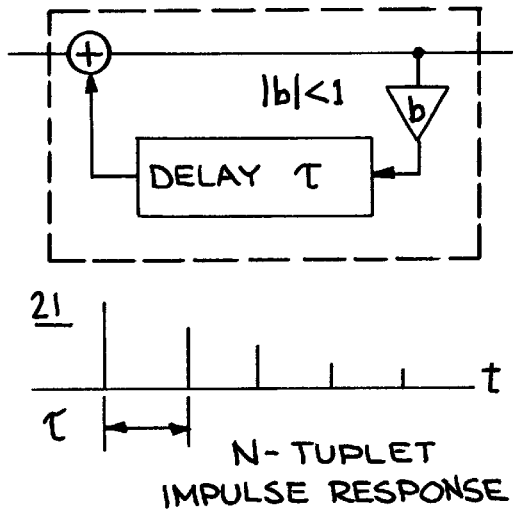
FIG. 1C illustrates a recirculating interferometer concept and its impulse response.

The partial coherence is imprinted on the source waveform by the transmitting interferometer by creating from the original waveform a pair or N-tuplet of waveform replicas, where N is not infinite, and the replicas are separated in time by $\tau_1$. Without this imprinting, an incoherent source would not create an autocorrelation peak near $\tau_1$, because that is the definition of incoherence. The preferred embodiments use either a two-path interferometer (FIG. 1B) or a recirculating interferometer (FIG. 1C). The two-path interferometer creates two equal strength pulses in its impulse response separated by $\tau$. The recirculating interferometer creates an infinite number separated by $\tau$ having a geometrically decreasing strength. The number of pulses having at least 50% of the original amplitude is approximately N. Other interferometer impulse responses are permissible, provided the spacing of output pulses is a uniform $\tau$.

As the recirculating gain coefficient $|b|$ approaches unity, the N approaches infinity. An infinite value for N is not preferred because then it is impossible for the output waveform to change. An evolving waveform is preferred so that speckle (temporary coherences) is removed by averaging. On the other hand, increasing N increases the robustness of the autocorrelation to statistical noise somewhat. The optimum N may depend on the noise environment, but is likely to be N=2 to 4.

The term "replica" in the definition of the interferometer should be qualified. The undelayed and delayed components of the interferometer output must be coherently identical to each other. However, these are allowed to differ from the waveform applied to the interferometer. This is equivalent to allowing a distortion 322 or 320 in the interferometer mechanism, as shown in FIG. 1E, provided the distortion affects delayed 321 and undelayed 325 portions of the waveform equally.

Figure 2A:
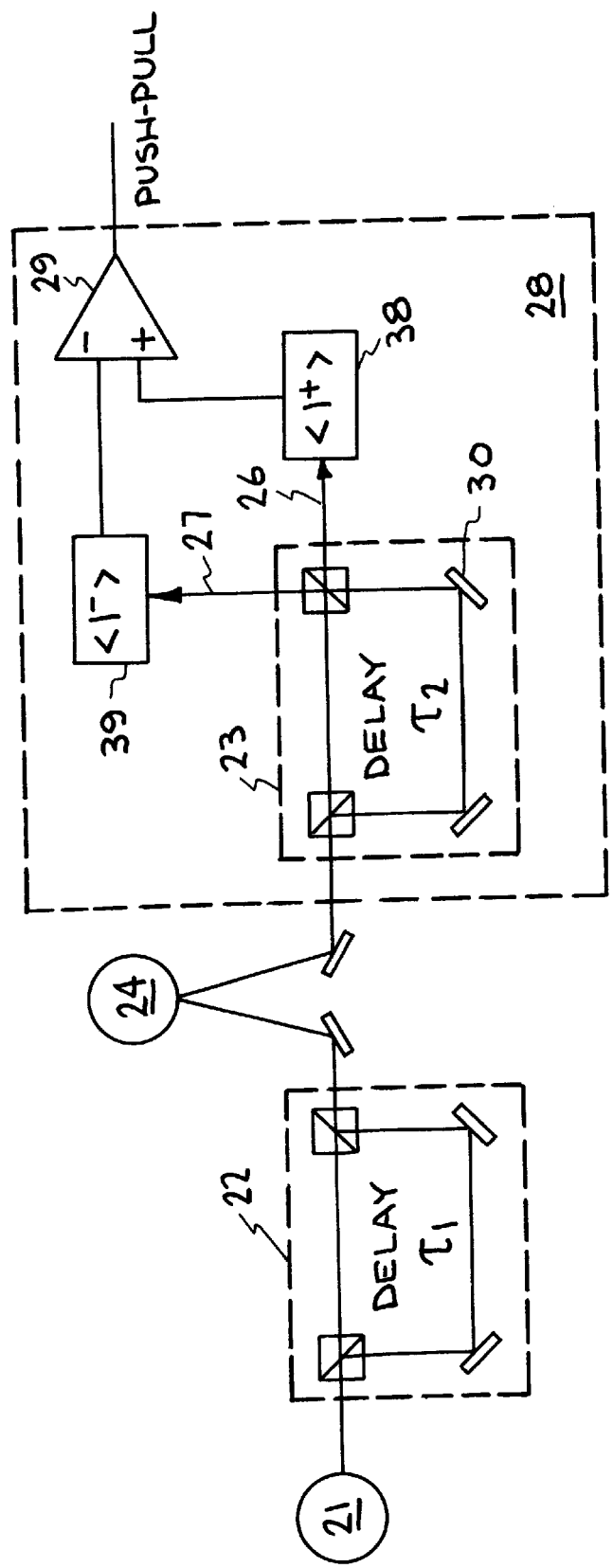
FIG. 2A shows an optical embodiment of the invention for measuring velocity.

The process that allows a slight Doppler shift to be measured from a short coherence length waveform can be explained by FIGS. 2A–E. FIG. 2A shows an optical embodiment of the invention that measures only the velocity and not the range, corresponding to output 8 of FIG. 1A. This apparatus is described in U.S. patent application Ser. No. 08/597,082, incorporated herein by reference. Although the waveform in general can be of arbitrary length, the explanation is simplest by modeling the source 21 as a single very short pulse 36 having the same duration as the coherence time $\Lambda/c$. The source waveform passes through a transmitting interferometer 22, reflects off a target 24, and passes through a receiving interferometer 23. The interferometer delays $\tau_1$ and $\tau_2$ are approximately equal, their gross value is denoted $\tau$ where $\tau=\tau_1\approx\tau_2$. For example, in one embodiment of FIG. 2A $\tau\approx10^{-8}$ s and $\tau_1$ and $\tau_2$ may differ by $10^{-14}$ s, which is a million times smaller than $\tau$. The time averaged intensity of the receiving interferometer complementary outputs $<I^+>$ 26 and $<I^->$ 27 are detected by detectors 38 and 39. The integration time of the detectors is longer than the coherence time $\Lambda/c$.

Figure 2B:
FIG. 2B models the source as a single short pulse.
Figure 2C:
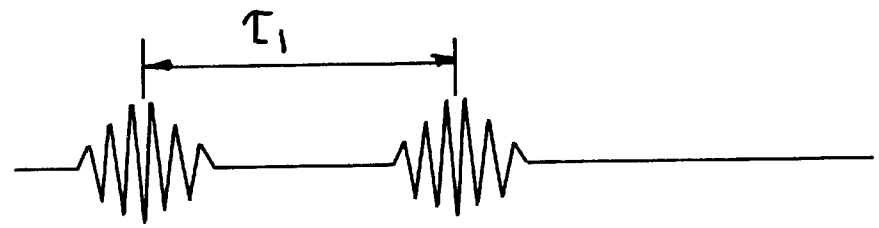
FIG. 2C shows the waveform after the transmitting interferometer.
Figure 2D:
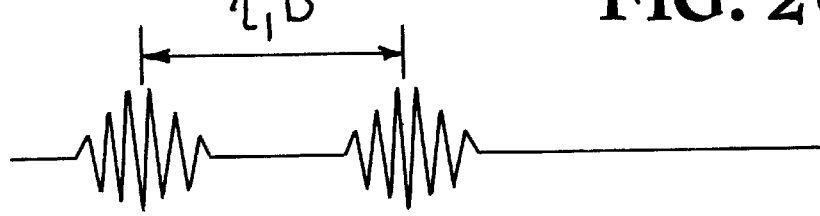
FIG. 2D shows the Doppler contracted waveform after reflection from the target.

FIG. 2B shows a hypothetical single source pulse. FIG. 2C shows the pair of identical pulses created by the transmitting interferometer. FIG. 2D shows the pair after reflection from the target 24 moving with velocity v toward the apparatus. The pulse separation has changed from $\tau_1$ to $\tau_1 D$ due to the Doppler effect, where D is the Doppler scaling factor D=(1−2v/c). That is, during the interval $\tau_1$, the target has closed its range by $2v\tau_1$ and hence shortened the arrival time of the second pulse by $2v\tau_1/c$. (This assumes the illumination reflects normally from the target. For other angles, the term 2v should be replaced be the time rate of change of the combined distance between the transmitter to target to receiver.)

Figure 2E:
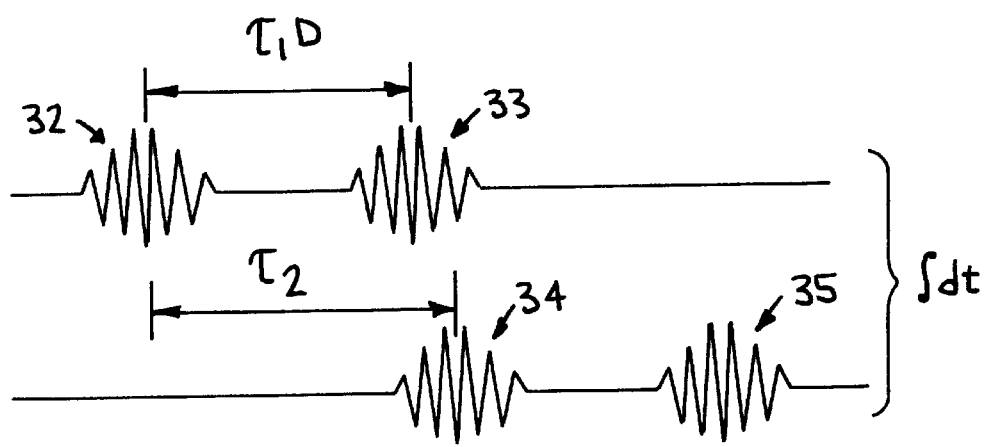
FIG. 2E show the four replica pulses created by the receiving interferometer.

The receiving interferometer creates a pulse pair for each of the two pulses applied to it, creating a total of four pulses, shown in FIG. 2E. The two inner pulses 33, 34 overlap if $\tau_1 D\approx\tau_2$ within the coherence length $\Lambda$, interfering constructively or destructively depending on the exact time difference. Suppose the total energy of these four pulses are integrated by the detector. The two pulses 32, 35 on the early and late ends contribute constant energy, independent of the Doppler multiplier. The two inner pulses 33, 34 contribute a fluctuating amount of energy, depending on whether there is constructive or destructive interference. That is, their contribution depends on the Doppler multiplier. These fluctuations are called fringes. Since 2 of 4 pulses contribute to the fluctuating portion, the fringe visibility is 50%. The target velocity is determined from the phase of the fringes.

Since long incoherent waveforms can be modeled as a superposition of many short pulses of duration $\Lambda/c$, this explanation also applies to a source of random waves having arbitrary length. It is not required that the detector be so slow that it integrates over all 4 pulses, it is only necessary to integrate over the inner two 33 and 34, and thus time average over approximately $\Lambda/c$. Thus, after an initial dwell time of $\tau_2$, the receiver becomes sensitive to Doppler shifts, and can detect them as rapidly as on the time scale of $\Lambda/c$. Practical embodiments however will use a much slower averaging time to reduce statistical fluctuations present in incoherent sources.

The apparatus of FIG. 2A used so-called two path interferometers that create a pair of replica waveforms from the source. The method also works for so-called recirculating interferometers that generate an N-tuplet of replicas.

The fringes are only formed for a specific range of delays, when $|\tau_1 D - \tau_2| = \Lambda/c$. Thus short coherence length sources produce the best velocity discrimination. This is relevant when there is more than one target contributing to the reflected signal. For a single target, any coherence length can be used. The term clutter denotes an undesired target, usually of small velocity such as the ground, that also contributes reflections.

The velocity is determined by the shift in phase of the fringes. During the interferometer delay $\tau$, the target range has changed by $2v\tau$, and this divided by the average wavelength $<\lambda>$ yields the number of fringes shifted from the zero velocity point. Thus, velocity is the fringe shift times $<\lambda>/(2\tau)$. For the optical example of FIG. 2A when $\tau=13$ ns and $<\lambda>=500$ nm, each fringe represents $\approx 20$ m/s.

The fringe phase can be determined from either $<I^+>$ or $<I^->$ singly, or from the difference $<I^+>-<I^->$. The latter is called the pushpull signal 29. The subtraction improves the fringe contrast in the output, because non-interfering constant components are eliminated. The pushpull signal versus delay is equivalent to an autocorrelation signal $AC(\tau_2)$. This can be seen by considering that if the undelayed wave is A, and the delayed B, then because the intensity detectors are square law devices, the push-pull signal is $(A+B)^2-(A-B)^2=4AB$, which after time averaging yields a value proportional to the autocorrelation $AC=\int AB\, dt$.

Thus when a square law detector is used after the interferometer 23 or 7, it is equivalent to an autocorrelation signal, as in 8. Note that if the signal to noise ratio is favorable, the push-pull subtraction is not required and either single interferometer output $<I^+>$ 38 or $<I^->$ 39 can determine the shape of $AC(\tau_2)$, since they differ only by a constant.

FIG. 3A shows that $AC(\tau_2)$ is a localized group of sinusoidal fringes having an envelope width of $\Lambda/c$. The fringes underneath the envelope are sinusoidal and are proportional to $$\cos\left[\frac{2\pi}{<\lambda>}c(\tau_1-\rho_2)-\frac{2\pi}{<\lambda>}(c\tau_1)\left(\frac{2v}{c}\right)+\phi_0\right] \quad (1)$$

where $\phi_0$ is some phase constant. Equation 1 depends on both delay difference $(\tau_1-\tau_2)$ and target velocity v. The envelope 50 and the phase of the fringes underlying the envelope shift together with velocity by an amount $2v\tau/c$ (52) along the delay axis from the zero velocity point, which is $\tau_2=\tau_1$. The velocity can be calculated from either the envelope shift or the phase shift, since they are locked together.

FIG. 3B shows that the presence of two targets having different velocities creates two fringe groups 54 and 56. One group 54 is due to clutter, presumed at zero velocity. The two groups can be resolved if their delay separation is greater than $\Lambda/c$. Thus the velocity ambiguity is $\Lambda/2\tau$. Hence, short coherence length illumination improves both the velocity and range resolution. As an example, for the radar embodiment if $\tau=2$ ms, and an aircraft traveling at 45 m/s is to be resolved from stationary clutter, then $\Lambda$ should be 18 cm. This implies a bandwidth $\beta=c/\Lambda$ of 1.6 GHz.

If the clutter and target are widely separated, then the presence of a target at an anticipated velocity can be detected by measuring AC at a single delay value. However, it is more useful to measure $AC(\tau_2)$ over a range of $\tau_2$, so that unanticipated target velocities can be detected, and to aid in distinguishing the clutter and target fringe groups. The known symmetry of the envelopes can be used to help distinguish the components having different velocities.

Measuring $AC(\tau_2)$ over a range of $\tau_2$ can be done in the apparatus of FIG. 2A either promptly, or by slowly scanning $\tau_2$. If an interferometer mirror such as 30 in the receiving interferometer is tilted slightly out of alignment, then the delay difference $\tau_1-\tau_2$ can be made to vary transversely across the output beam. This allows $AC(\tau_2)$ to be determined promptly for a single source pulse by photographing the output fringe pattern or using some other multi-channel detector. Alternatively, the interferometer can be aligned to produce the same delay uniformly across its output and a single detecting channel used. Then $\tau_2$ can be scanned slowly compared to $\Lambda/c$ to accumulate $AC(\tau_2)$ over a range. This latter method is only appropriate if the target velocity changes slowly.

If the radar/sonar observes a set of targets that are unresolvable in range and possess a distribution of velocities, then if the velocity spread exceeds ½ fringe shift, the fringe amplitude for the group will begin to blur away. This is an advantage, since it means that clutter such as weather and the seas which have a distribution of velocities can self-cancel, aiding separation of target from clutter.

FIGS. 4A–C illustrate that the process of computing the net autocorrelation fringe pattern is a convolution, indicated by symbol 72, between a velocity distribution and the fringe pattern 74 from a single target having a distinct velocity. The shape 74 could be called a single velocity impulse response. FIG. 4A shows that the velocity distribution for a single target having a well defined velocity is a spike 70. The convolution between the spike and 74 is a shape 76 very like 74. FIG. 4B shows the velocity distribution of hypothetical clutter 78. If the distribution is approximately symmetric and has a width which is greater than ½ the fringe wavelength inside 74, then the convolution will be a very weak set of fringes 79, much less than what would be implied by the area underneath the velocity distribution curve 78. FIG. 4C shows that the combination of clutter and a single velocity target can produce a fringe pattern 77 where the clutter partially self-cancels and contributes a diminished amplitude, allowing the target to be identified.

The self-cancellation effect for clutter is enhanced as $<\lambda>\rightarrow 0$. Therefore, as long as the desired target does not self-cancel, then it is advantageous to use as short of average wavelength as possible. This is in addition to the benefit of using short $\Lambda$ for improved velocity ambiguity.

Figure 5:
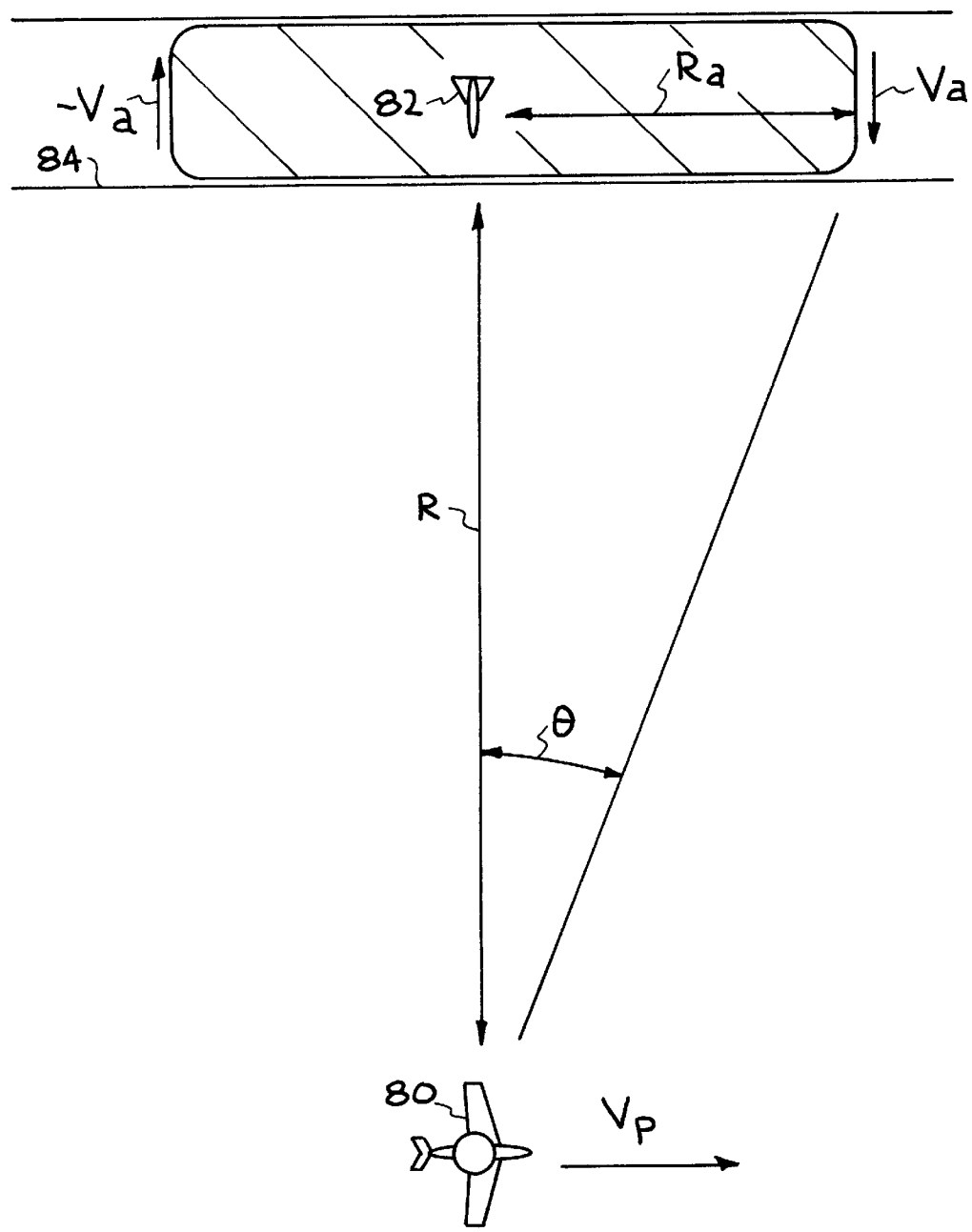
FIG. 5 shows the footprint of ground clutter that will remain after blurring due to a moving antenna.

The self-cancellation effect can be used advantageously in a moving antenna platform, such as an airborne platform, to lessen the contribution of ground clutter and effectively narrow the angular resolution of the radar similar to the principle in synthetic aperture radar (SAR). FIG. 5 shows that from the point of view of the antenna aircraft 80, which is moving transversely at a velocity $V_p$, the ground on either side of the target 82 is rotating. Only the strip of ground 84 within the range resolution of the radar around the target needs to be considered. The rotation generates a symmetrical velocity distribution for the ground clutter which self-cancels for large azimuth values. The magnitude of the apparent velocity due to rotation at an azimuth distance $R_a$ is $V_a = R_a V_p/R$. For azimuth distances below $R_a = <\lambda> R/(4\tau V_p)$ the apparent rotation does not exceed ½ a fringe. Thus there will effectively be a residue amount of ground clutter represented by the footprint that has an azimuth size of $R_a$. The angle θ in radians that this subtends from the point of view of the airborne platform is $\theta = <\lambda>/(4\tau V_p)$. For example, if $V_p = 300$ m/s, $\tau = 2$ ms and $<\lambda> = 1$ cm then $\theta = 0.24°$. This is a similar value as that computed from a SAR radar when 2 pulses are considered. That is, in both the present invention and in SAR, the effective transverse size of the antenna is given by the distance the platform moves during the observation time of the radar.

In SAR, successive received waveforms are added, after offsetting by the repetition time of the emitted pulse train, so that a correlation is accumulated. A changing slight phase shift is usually added to mimic the curvature of a giant curved antenna along the airborne platform's line of flight, to effectively focus the synthetic antenna at distances other than infinity. FIGS. 6A and B help illustrate how the present invention differs from SAR and other prior art. 1) The purpose of SAR (FIG. 6A) is radar mapping, that is, range finding instead of velocimetry, and thus the arrival time of successive reflections are referenced to the emission time of the transmitted pulse to determine range. In the present invention (FIG. 6B); however, to perform velocimetry there is no reference to the emission time of the transmitted pulse. 2) The present invention is able to form correlations 92 from an incoherent source by passing the source through a transmitting interferometer 90. This imprints a partial coherence. The individual pulses in the source pulse train 94 in FIG. 6B are labeled alphabetically to indicate their individuality and that they would have no correlation between them. Because the interferometer delay is set to be approximately the pulse repetition period (PRP), each pulse of the transmitted pulse train 96 contains components of at least two individual pulses from the source train 94 (more if a recirculating interferometer is used). Thus, when they are superimposed in the autocorrelation process 92, the two similar components can correlate. For example in 92, "A,B" will partially correlate with "B,C" because of the common B component.

In the prior art however, if an incoherent source is used, there will be no correlation in the receiver at 98. Even though pulses "A", "B" and "C" are added so that they superimpose in time, there is no coherent correlation between them because they are random and unrelated. Any correlation would be of an incoherent kind, that is, related to the envelope of the pulses and not the underlying phase.

In the velocimeter apparatus of FIG. 2A, prisms (wavelength dispersive elements) could be placed in between the receiving interferometer 23 and the detectors 26 and 27. These would create a spectrum that would be recorded by multi-channel detectors. This spectrum, and therefore the autocorrelation would have fringes, as shown in FIG. 3C and 3D for the case of $\tau_2 = \tau_1$. Equation 1 shows that the fringes plotted versus 1/λ are sinusoidal, with a spatial "frequency" along the 1/λ axis of $[c(\tau_1-\tau_2)-2\tau_1 v]$. If $\tau_2 = \tau_1$, then the target velocity is proportional to this spatial frequency 58. FIG. 3D shows that the clutter 64 can be distinguished from the target 62 by its much lower spatial frequency. The plot is versus the variable 1/λ, which is proportional to wave frequency and should not be confused with the term spatial frequency discussed above.

The autocorrelation can therefore can be plotted versus both $\tau_2$ and 1/λ, in a 2-dimensional map as shown in FIG. 3E, where AC maxima are displayed as black or gray fringes. The gray 68 fringe network associated with a target can be easily distinguished from the black fringes 66 of stationary clutter. The networks are the same shape, just translated in delay. The amount of translation yields the velocity. This flexible method of signal presentation may be useful for distinguishing target from clutter in a noisy environment. For example, if an enemy is jamming a radar with quasimonochromatic waves, these can be ignored most easily in the AC(λ) presentation. If the enemy is jamming with short pulses, then these can be most effectively isolated by the AC($\tau_2$) presentation.

If the complementary outputs <I⁺> and <I⁻> are added instead of subtracted, then the envelope 60 of the AC is obtained. This is the power spectrum of the reflected signal. Thus the target albedo spectrum can be measured, after dividing by the known spectrum of the transmitted illumination. Changes in the resonances of the target albedo can yield information about the structure and orientation of the target, in addition to shape information that comes from the range signal, discussed later.

FIG. 1A shows the transmitting and receiving antennas to be separate, to indicate that in general the source waveform can be arbitrarily long. However, because reflections from distant targets are very weak, a practical echolocation system will usually operate in a pulsed mode so that strong and immediate reflections from short range clutter do not swamp the distant weak signals, and so that a time dependent gain can be used on the receiving amplifier. Conventionally, the same antenna is used for transmission and reception, through the use of a duplexer switch. FIG. 7A illustrates that the expected best radar and sonar embodiment of this invention is to envelope the source waveform into broad pulses of duration PW, repeated in a train with a pulse repetition period PRP. The PW would be determined by the minimum target range and the PRP from the maximum target range. For a radar example, for a minimum and maximum range of 5 km and 150 km respectively, the PW and PRP would be 33 μs and 1 ms, respectively.

To maintain the approximate pulse envelope, the transmitting interferometer delay $\tau_1$ should be nearly equal to an integer multiple of the PRP. However, $\tau_1$ is not required to be exactly proportional to PRP. FIG. 7A shows the random source signal 100, the enveloping signal 102, and the signal after the enveloper consisting of individual and uncorrelated pulses of a train 104 labeled alphabetically. When $\tau_1$ is nearly a multiple of PRP, then the pulse train 108 after the interferometer 106 is a pulse train where each pulse is an additive combination of at least two of the individual pulses of the previous train 104, (more than 2 for a recirculating interferometer, FIG. 1C). This generates the partial coherence that allows autocorrelation. For example, pulses 110 and 112 both contain a component of the source pulse "B" 114, and thus there can be interference in the subsequent receiving interferometer. FIG. 7B shows the transmitted pulse train if $\tau_1$ is approximately 3 times PRP. To prevent the enemy from rapidly determining $\tau_1$, then it is advantageous to randomly change $\tau_1$ after each source pulse of 104. Such a random jitter in $\tau_1$ relative to PRP is indicated in FIG. 7B by the variation in overlap in the edges of the pulses 116, 118. The enemy cannot determine $\tau_1$ without waiting for the later pulse to arrive. However by then both pulses have reflected from the target and useful information about the target range and velocity has been obtained.

Figure 8A:
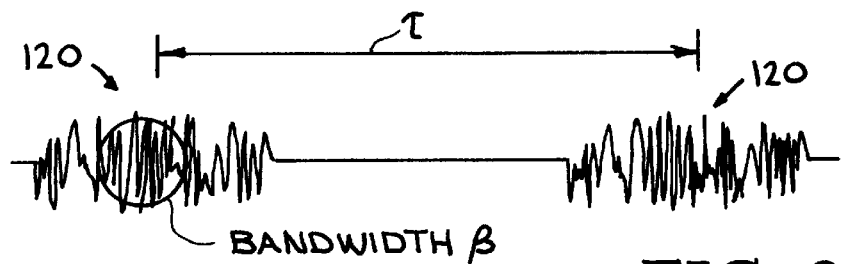
FIG. 8A shows a pair of identical replicas of a pulsed incoherent waveform.
Figure 8B:
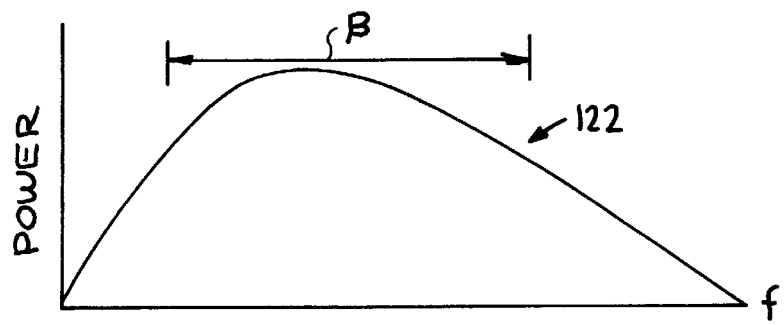
FIG. 8B shows the power spectrum of the incoherent waveform before being paired.
Figure 8C:
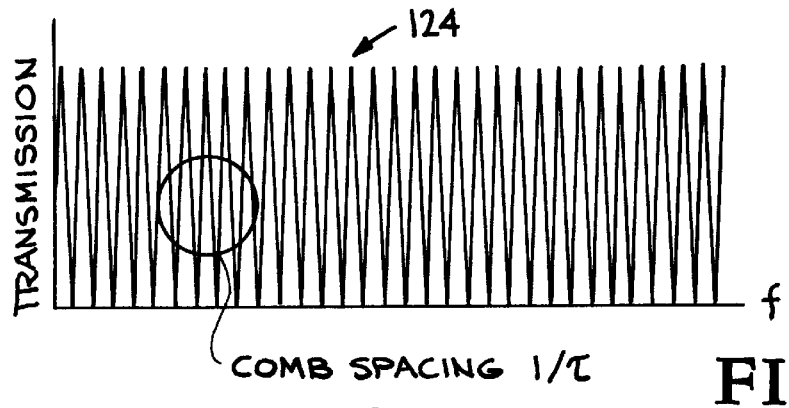
FIG. 8C shows the fine comb filter nature of an interferometer.
Figure 8D:
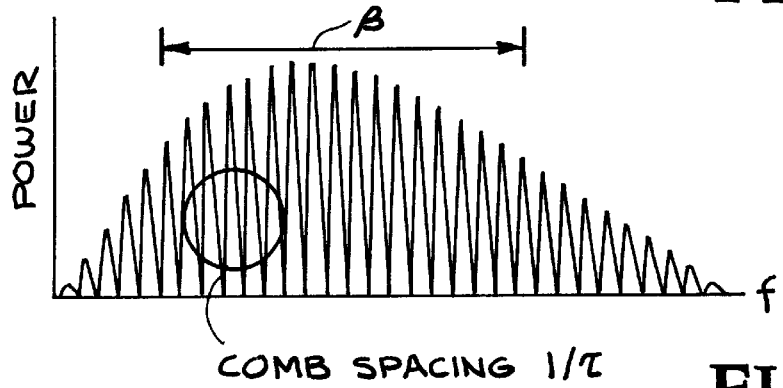
FIG. 8D shows the power spectrum of a pair of identical replicas of a pulsed incoherent waveform.

A useful analysis of the invention is in the frequency domain. FIG. 8A shows two replicas of a incoherent source waveform pulse separated in time by $\tau$, as the waveform would appear after a two-path transmitting interferometer. Each individual replica 120 has a hypothetical power spectrum shown in FIG. 8B, having a bandwidth $\beta$. The two-path interferometer has a transmission spectrum shown in FIG. 8C. It can be described as a comb filter, since it consists of a periodic array of peaks and valleys having a periodicity $1/\tau$. For the particular case of a two-path interferometer the transmission function is sinusoidal. A recirculating interferometer generating a N-tuplet of replicas would produce a comb filter with the same comb periodicity, but with thinner and non-sinusoidal comb peaks. The overlap between the single pulse spectrum 122 and the interferometer spectrum 124 is the power spectrum of the pulse pair of FIG. 8A.

The fineness of the comb is what allows detection of small Doppler shifts, much smaller than $\beta$, and yet the large gross spectrum bandwidth $\beta$ produces a short coherence length $\Lambda$ which allows high range resolution. For example, if $\tau=2$ ms and $\beta=1.6$ GHz, then the comb spacing is 6 million times smaller than the gross bandwidth.

The velocimetry aspect of the invention can be considered to be two nearly matched comb filters in series. (Matched in comb periodicity, but not matched in the conventional usage of that term in radar. The second interferometer is not a time-reversal of the first.) The output of the receiving interferometer is the intensity that passes through overlap of both filters integrated over all the frequencies of the source. When $\tau_1=t_2$ and v=0, then the power spectra perfectly overlap and large power is passed. Target motion causes the power spectrum of the pulse pair reflected from the target to scale by the factor D=(1+2v/c). This scaling causes large fluctuations in the overlap which are manifested as fringes in the output power of the receiving interferometer. This effect is analogous to the Moiré fringes seen when two meshes of slightly different pitches are overlapped. This allows detection of pitch changes too slight to be observed directly in a single mesh.

FIG. 9A shows the receiving interferometer spectrum 130 and the reflected signal spectrum 132 from a pulse pair when the two periodicities are perfectly matched, when $\tau_2=\tau_1 D$. FIG. 9B is the resulting overlap intensity spectrum. The integration of this over frequency is the detector time averaged signal <I$^+$> which yields the autocorrelation. This would correspond to point 133 of FIG. 3A. As the velocity changes, or if $\tau_2$ changes, the periodicity becomes mismatched. FIG. 9B shows the overlap under the slight mismatch equivalent to half a fringe, that is, when $c(\tau_1 D - \tau_2) = <\lambda>/2$. The integrated power is much reduced and corresponds to point 135 of FIG. 3A. The large fluctuations in power generate the large fringes at the center of the fringe group envelope 50.

If $\tau_2$ is set to be greatly mismatched to the target velocity, then weak or no fringes are produced. This can be seen because there is little difference in the overlap integral when $\tau_2$ is dithered by half a fringe. FIG. 9D shows the overlap when $\tau_2$ is greatly mismatched from $\tau_1 D$. FIG. 9E shows the overlap when $\tau_2$ is a half fringe greater. The areas under the two overlap curves 138 and 139 are nearly equal and correspond to the portions 137 and 139 of FIG. 3A where the AC does not fluctuate significantly.

For a single target (no clutter), the invention can operate using source waveforms of any kind of coherence, high or low, and still generate fringes, and the phase of the fringes will yield the correct velocity according to Equation 1. However, one specific kind of waveform is not preferred for this invention. That is a waveform where $\Lambda \sim \tau_1 c$ and which $\Lambda$ fluctuates, because in that case the source will already have a fine comb spacing nearly the same as the transmitting interferometer, and thus the transmitted intensity will fluctuate strongly with small changes in source $\Lambda$. These fluctuations do not prevent determination of the velocity, because they do not affect the fringe phase in the receiving interferometer output. However, they may be a nuisance because the signal level and therefore the fringe amplitude will vary erratically. Because of this, it is recommended that the source should not be a repeating pattern with a repetition period close to $\tau_1$, unless the period is carefully stabilized to be constant.

The double interferometers of this invention should not be confused with the matched filters of pulse compression radar. The filters of the two techniques have different purposes and behaviors. Furthermore, the pulse compression technique will not detect a Doppler shift of 1 part in $10^6$ using the same source bandwidth as this invention. In pulse compression, the first filter stretches the pulse by a factor of 100 to 1000 to lower the peak power by this same factor. A single pulse is outputted for a single pulse inputted. In the present invention, two identical pulses are outputted, not one, and each are not significantly broadened from the original. Consequently the peak power is only reduced by a factor of 2. In pulse compression, the second filter is a time reversal of the first, so that in the receiver the single broad reflected pulse is compressed to its original narrow width. In the present invention, the second interferometer is not a time reversal of the first, since it does not output a single pulse for two input pulses.

In pulse compression, the intensity transmission spectrum does not contain valleys which completely eliminate some frequencies. This is because spectral components are merely moved around in time, not eliminated. Without these narrow valleys it is not possible for the pulse compression scheme to measure a Doppler shift that is 1 part in $10^6$ narrower than the source bandwidth.

The expected practice of a radar embodiment would be to initially use the velocity-only signal 8 (of FIG. 1A), or this signal with simple range gating, to search for the presence of a moving target and measure its velocity. Once the velocity is known, the velocity discriminating cross-correlation signal 9 can be used to determine the range and size of the target. This is done by setting $\tau_2=\tau_1 D$ for the expected target velocity, and setting the moving reference frame delay 11 to move at the expected velocity. Then $\tau_2$ is dithered by a slight amount, equivalent to ½ of a fringe, to cause the portion of the cross-correlation representing the target to fluctuate in synchronism with the dither.

The cross-correlation signal 9 is formed by adding the receiving interferometer output 12 to a delayed copy of the source waveform, which is delayed by the moving reference frame delay $\tau_3$ 11. This sum is then squared and time averaged over duration at least as long as $\Lambda/c$ by element 9.

The purpose of the moving reference frame delay $\tau_3$ is to reduce the motion of the target in the output cross-correlation signal 9 so that slow electronics after the time integration at 9 can display it without blurring its position. Secondly, the delay is set so that if the source was a short pulse, the copied source waveform correlates with the inner two pulses 33, 34 and not the outer pulses 32, 35 of the output of the receiving interferometer. Thus, the gross value of $\tau_3$ is set to $\tau_3=\tau_1+2R/c$, where R is the expected range.

The rate of change of $\tau_3$ is set to the expected target range rate, $d\tau_3/dt=-2v/c$.

The cross-correlation aspect of the present invention can be explained by considering the output at 12 to be the source waveform 10 passing through a single filter having the same impulse response as the combination of interferometers 6 and 7 in series. This effective impulse response has the form shown in FIG. 10A and 10B. If $\tau_1 D=\tau_2$, then the two interferometers are exactly matched and their combined impulse response has a central peak 150 formed from the constructive interference of the two inner pulses 33, 34. If $\tau_2$ is increased by half a fringe, that is if $\tau_1 D=\tau_2+\lambda/2c$, then the central peak disappears 152 because of destructive interference between the inner two pulses. The outer two lobes 154, 156 are independent of the dither. Thus the signal 12 to be cross-correlated contains portions identified with the target that fluctuate synchronously with the dither applied to $\tau_2$, provided the target velocity matches the anticipated velocity.

For clutter having velocity that does not cause a match between interferometers 6 and 7, the combined impulse response is insensitive to dither in $\tau_2$. FIG. 10A shows that in this case the combined impulse response has two peaks 158, 160 instead of one in the center, and the height of these does not fluctuate with $\tau_2$ dither because they do not overlap. Thus, the portions of the signal at 12 associated with clutter does not vary synchronously with dither.

If there is no distortion anywhere in the signal path between the source and signal 12, then the width of the peak 150 in the combined impulse response is infinitely narrow. In this case, for the target having its velocity exactly matched the cross-correlation signature will not be any wider than it would be without the interferometers. The presence of distortions will cause the cross-correlations signatures to blur. However, the velocity discrimination will remain sharp with respect to the velocity parameter because it depends on autocorrelation.

Figure 11:
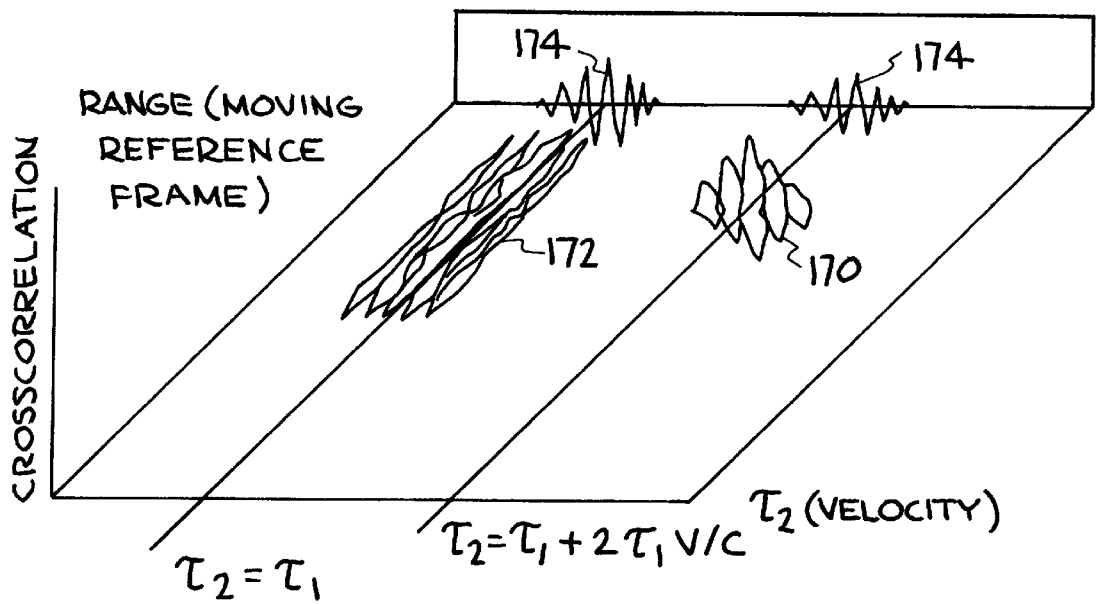
FIG. 11 shows a 2-dimensional plot of cross-correlation signal versus receiving interferometer delay and the delay corresponding to range in the moving reference frame.

The cross-correlation signal plotted versus range and $\tau_2$ would have the schematic character indicated by FIG. 11. The data could be processed to present only the portions of the signal fluctuating synchronously with the dither in $\tau_2$. The target 170 would stand out from clutter 172 at the same range because it would have a sinusoidal dependence on $\tau_2$. The projections 174 of the data integrated along the range axis would be similar in appearance to $AC(\tau_2)$ shown in FIG. 3B.

Figure 13:
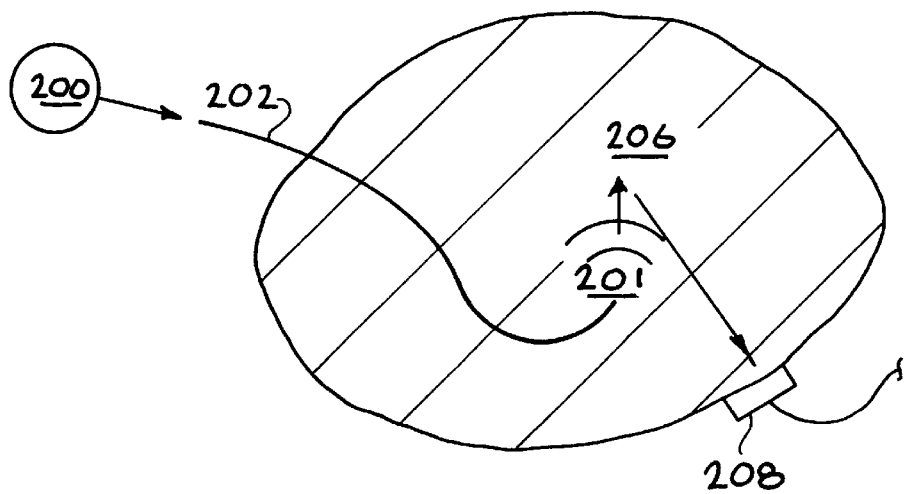
FIG. 13 shows an embodiment for biomedical ultrasound where light through a fiber generates sound.
Figure 12:
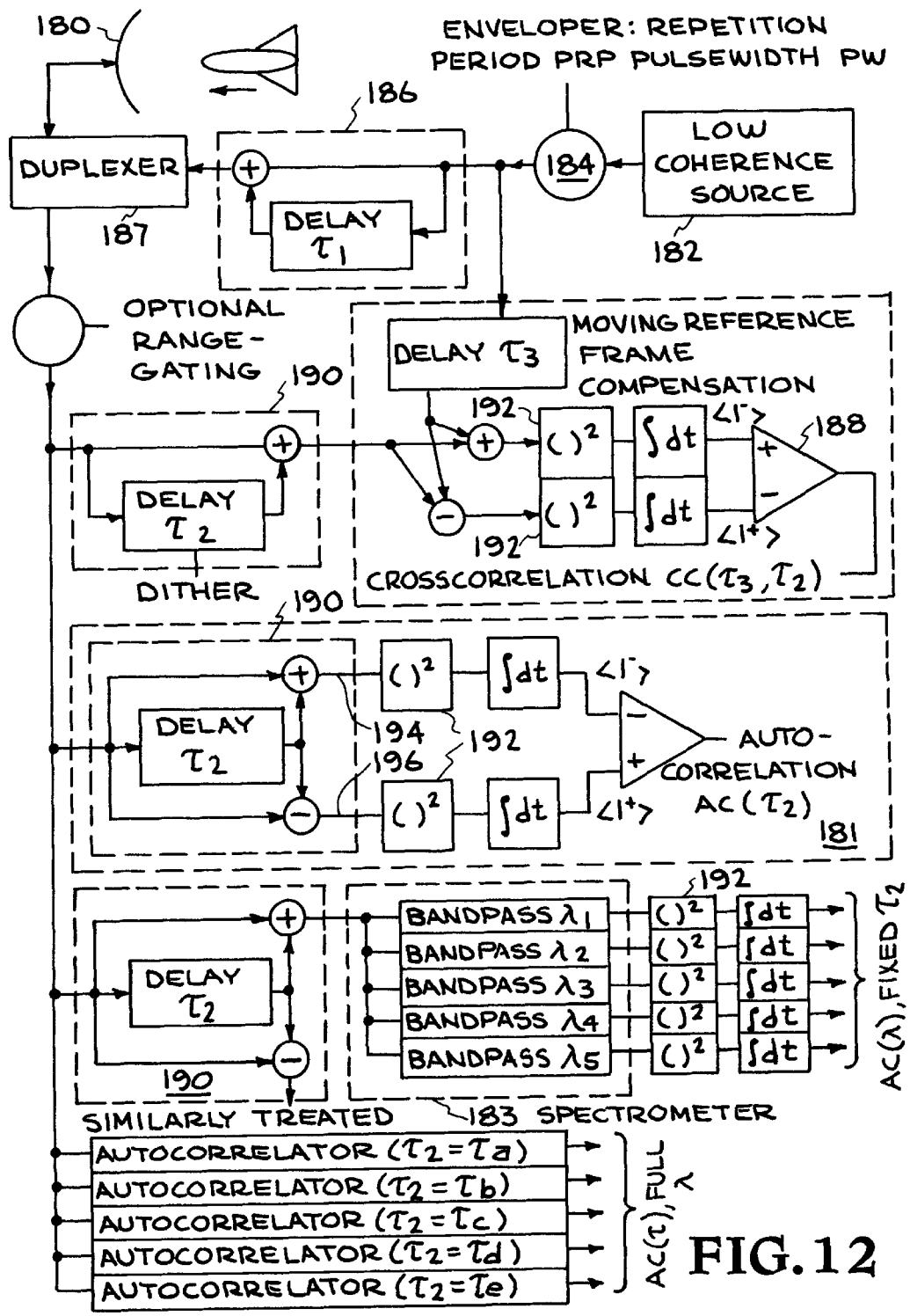
FIG. 12 shows an embodiment for radar, sonar or ultrasound using essentially analog electrical devices.

FIG. 12 shows the invention embodied for radar, sonar or ultrasound or any wave which can be transduced into an electrical signal by the antenna or transducer 180. A source of electronic noise 182 is enveloped at 184 into pulses of width PW and repetition period PRP, consistent with conventional usage of a single transducer and duplexer 187. For ultrasound, separate transmitting and receiving transducers can be used effectively. The transducer must respond to or actuate the field of the wave, such as pressure in the case of sound, and not a time averaged quantity such as sound intensity. The transducer must be coherent so that the same waveform always produces the same response. For example, FIG. 13 shows a possible medical embodiment of the transducers. Laser light 200 propagating through an optical fiber 202 vaporizes tissue inside a medical patient's body at 204 and generates sound, which reflects off a target 206 and is detected by a transducer 208. This embodiment will work provided the vaporization is not so intense during the undelayed waveform component that the tissue responds differently for the delayed waveform component.

In all the preferred embodiments, simple range gating can be performed in the conventional manner on the received signal to reduce clutter signal from range areas known to not contain the target. This is shown in FIG. 12 at 185. There is no advantage to having the range gate width less than PW. This range gating is an incoherent process, as opposed to the coherent cross-correlation at 188, because the gate width is much longer than $<\lambda>$.

Figure 14:
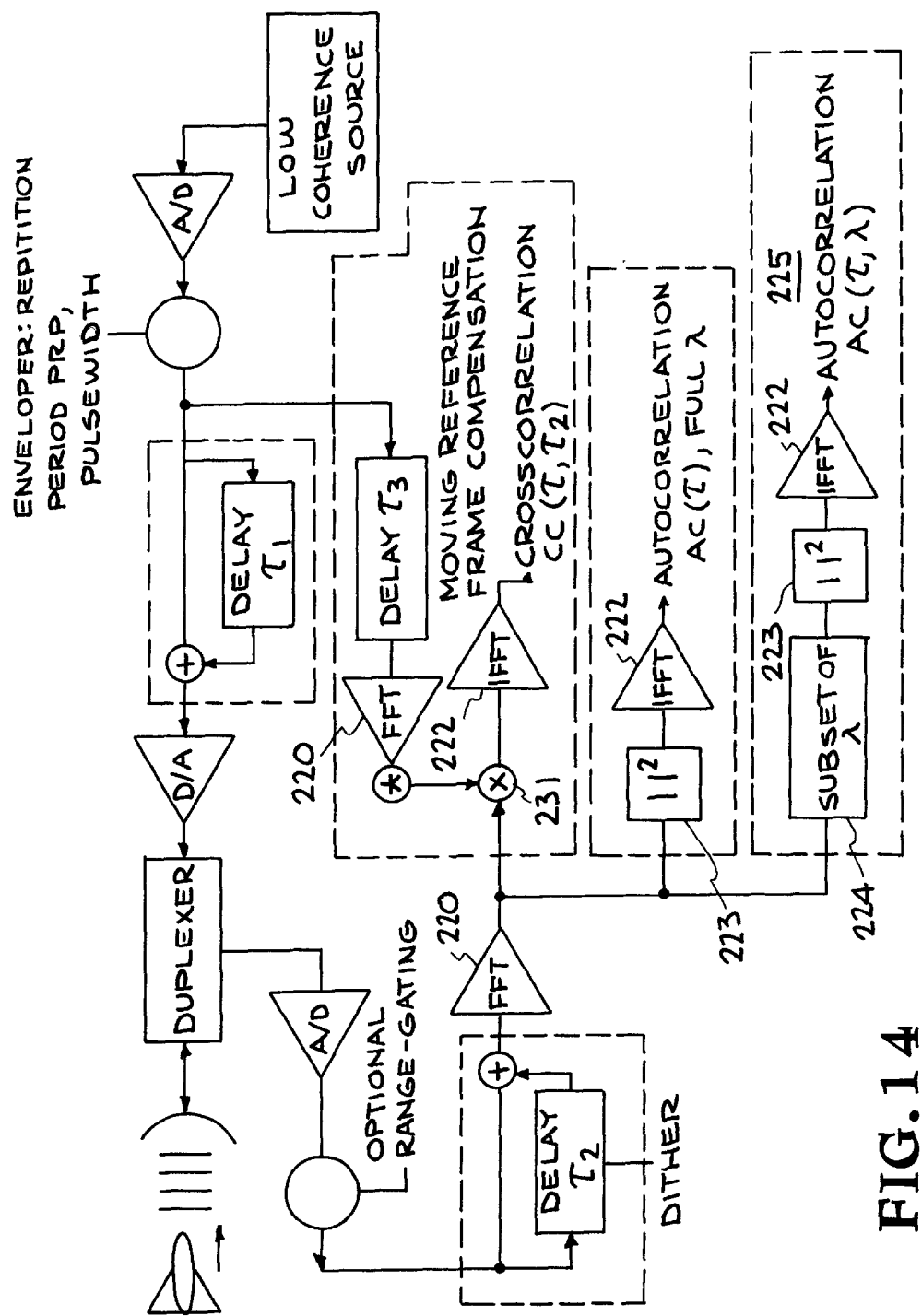
FIG. 14 shows an embodiment for radar, sonar or ultrasound using numerical processing to perform correlations.

To form correlations, the signals must pass through a non-linear device 192 that creates a squared component that is time averaged over at least $\Lambda/c$. This squared component corresponds to the intensity of the signal. The receiving interferometer 190 is shown duplicated only for clarity. The outputs 194 and 196 can generated once and then used in several spots to form the various kinds of cross-correlations and autocorrelations. The prompt formation of the autocorrelation $AC(\tau_2)$ over a range of $\tau_2$ can be accomplished by multiple autocorrelators 181 having slightly different delays, but an easier method is to use Fourier transforms, as in FIG. 14. After the waveforms have been Fourier transformed by 220, the cross-correlation is produced by multiplying one signal at 221 with the complex conjugated of the other 226 and taking the inverse Fourier transform of the product 222. The autocorrelation is produced by squaring the magnitude at 223 before taking the inverse Fourier transform. This automatically produces the spectral dependence of these correlations as an intermediate step before they are inverse transformed. By masking the undesired spectral components at 224, the AC spectrum is obtained 225.

Some of the benefits of incoherent illumination can be achieved by sets of simultaneous monochromatic sources that cover roughly evenly but sparsely the bandwidth range $\beta$. This may be a less expensive way to generate somewhat incoherent illumination. Secondly, this can be used in conjunction with a filter before the receiver to thwart jamming by the enemy, as shown in FIG. 15A. The source 230 generates multiple narrowbands whose configuration changes randomly rapidly, as shown in FIG. 15B. The spectral information is passed to a multiband narrowband filter 232, which prevents harmful jamming signals from entering the sensitive receiver. The spectral information is delayed at 234 by the same delay as the transmitting interferometer, (except for differences in arrival time due to different target range), so that the filter 232 anticipates the correct narrow bands to pass when the legitimate signal from the target arrives. This system can also be used to perform a kind of range gating, since if the spectral content is changed more rapidly than PRP, the filter 232 can exclude signals from other than the desired range.

Figure 16:
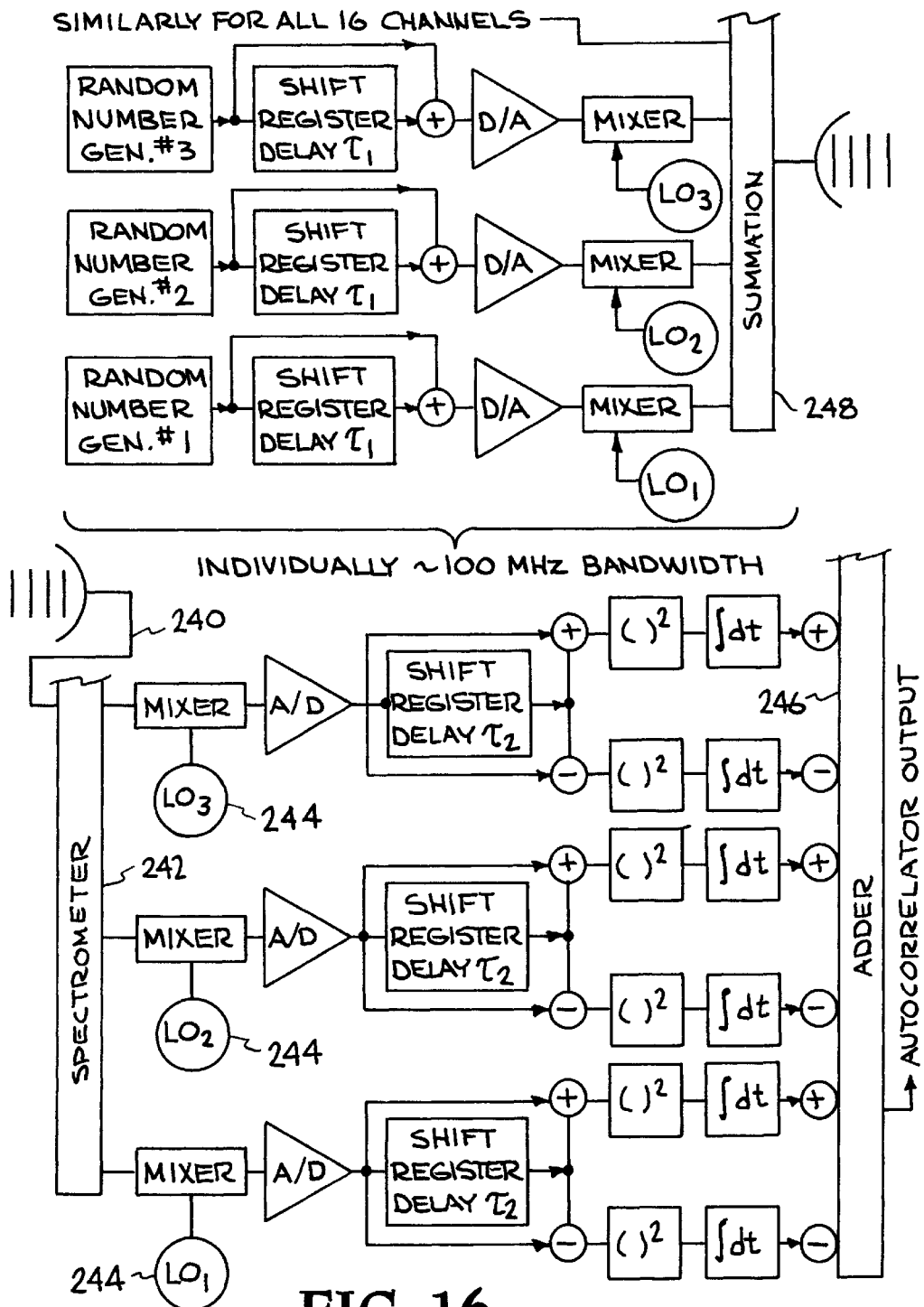
FIG. 16 shows a means for creating a high bandwidth long delay interferometer using parallel heterodyning.

A means for implementing a long delay high bandwidth interferometer for electrical signals is shown in FIG. 16. The idea is that different sections of the signal spectrum can be heterodyned to a set of lower bandwidth channels by mixing with a set of local oscillators. Multiple parallel channels are used that preferably cover the complete original spectral bandwidth $\beta$ contiguously. A less-preferred embodiment uses channels that sparsely cover the spectrum. The bandwidth requirements of an individual channel are proportionately less than the original signal. For the example of FIG. 16, a 1600 MHz bandwidth received input signal 340 is split by a spectrometer 342 into 16 channels of 100 MHz bandwidth spaced every 100 MHz. The spectrometer could be constructed of a collection of bandpass filters. The set of local oscillators 344 heterodyne the different bands to a common 100 MHz bandwidth. From this point, all the channels are identical. The autocorrelation or cross-correlation is accomplished on the individual channels, and then the combined output signal formed by reheterodyning with the same set of local oscillators and summing at 346 or 348. An analogous process occurs in the transmitter.

The advantage of this scheme is that less expensive electronics can be used to implement the delays and analog to digital conversions when the bandwidth is low. The average frequency of the local oscillators are not required to be exactly locked in a mathematical relation to the other local oscillators, provided the same local oscillator set is used for the transmitting and receiving interferometers. Their frequency can wander in the long term. Over the delay $\sim 3\tau$, the local oscillator must be stable to $\pm\frac{1}{4}$th a cycle, so that for a given channel the signal in the transmitter interferometer encounters the same delay within $\frac{1}{4}$th fringe as in the receiving interferometer, including the time traveling to the target and back. For the example of a 10 GHz average frequency and delay of 2 ms, this is a stability requirement of 0.01 part per million per 6 millisecond, which is readily achievable.

Figure 1D:
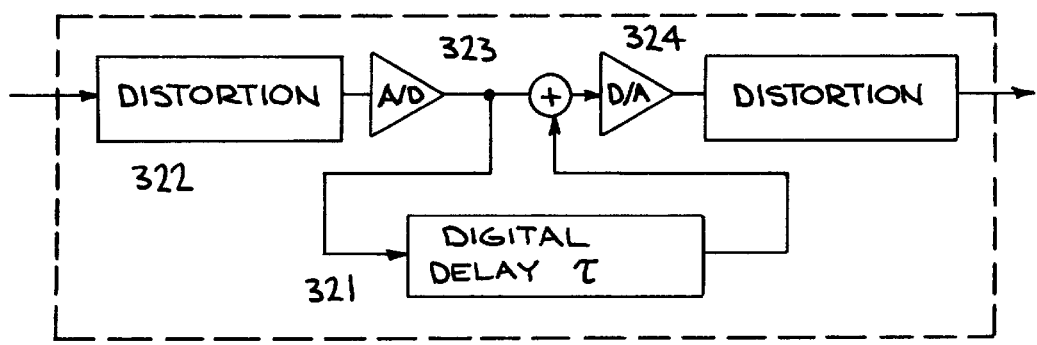
FIG. 1D illustrates a digital embodiment of a two-path interferometer.
Figure 1E:
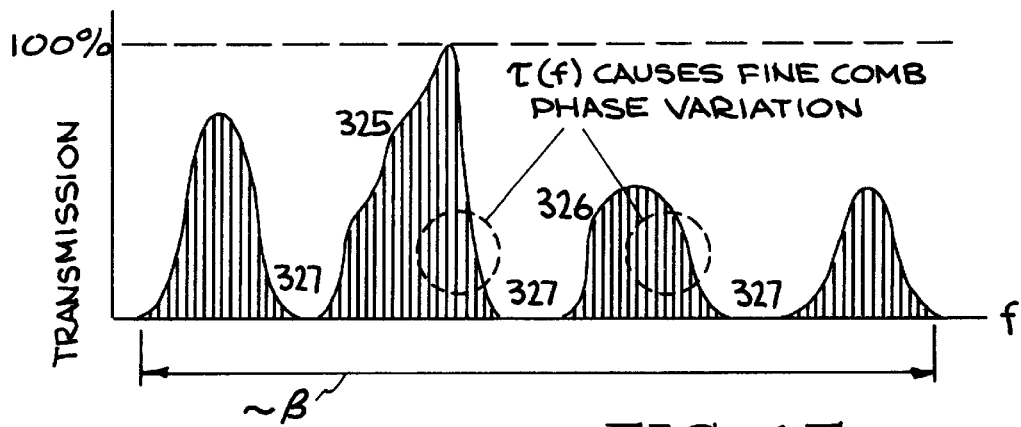
FIG. 1E illustrates the transmission spectrum of an interferometer with severe distortion.

If the local oscillator frequencies are not locked in a regular mathematical relationship, or if the bands do not cover the original bandwidth contiguously and evenly, then this is equivalent to a signal distortion 322 or 320 in FIG. 1D prior to the analog-to-digital conversion 323 or after the digital-to-analog conversion 324. This could produce a hypothetical distorted interferometer spectrum FIG. 1E which contains stop bands 327. Since this distortion is applied equally to delayed 321 and undelayed 325 signal paths, this distortion will not prevent the formation of a useful autocorrelation.

The presence of a dispersion in the time delay, that is, a frequency dependence to $\tau$, will cause the phase of the fine fringe comb to be incoherent from pass band 325 to pass band 326. However, this will not blur (disperse) the full bandwidth autocorrelation if the delay dispersion characteristics of the transmitting and receiving interferometers are the same. If they are not exactly the same, any residual dispersion in the autocorrelation can be corrected mathematically after the time averaging has been performed (where it is less computationally expensive), since it corresponds to a systematic tilting or curving of the network of fringes in $AC(\lambda, \tau_2)$ shown in FIG. 3E.

A long delay interferometer can be constructed of a single mode optical fiber or an acoustical delay line. If the other portions of the apparatus use electrical signals, the electrical signal modulates an optical beam or a sound wave which travels through the fiber or acoustical delay and is demodulated at the end of the delay back into an electrical signal. The undelayed signal could also be converted to and from light or sound so that the same distortions are imparted to it by the conversion process. This way the delayed and undelayed paths have the same distortion. The dispersion in the delay should be matched between transmitting and receiving interferometers.

Figure 17:
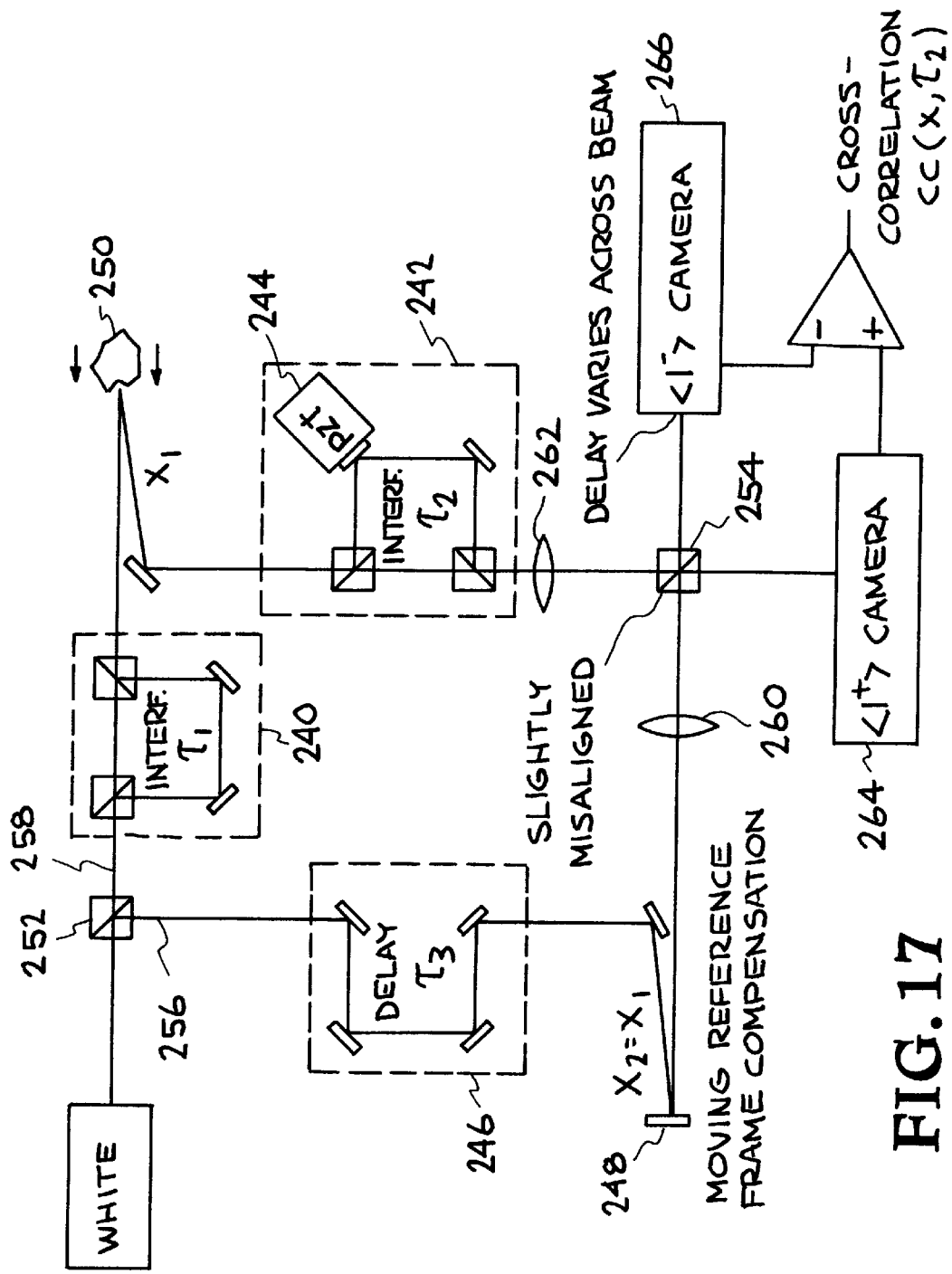
FIG. 17 shows an open-beam optical embodiment of the invention.

An optical embodiment for invention which measures range while discriminating velocity is shown in FIG. 17. The optical embodiment for the velocity-only signal has already been discussed in FIG. 2. The interferometers 240 and 242 are constructed similarly and are image superimposing interferometers. The image superimposing condition is required of any interferometer in this invention working with an image or using an unparallel rays, including interferometers using sound or microwaves that propagate in 3-dimensions as opposed to being converted to 1-dimensional electronic signals or 1-dimensional optical signals along a single mode fiber. (It is possible to construct lenses, mirrors and beamsplitters and thus interferometers analogous to light for sound and microwaves.) Practical sources of incoherent broadband light emit light over a range of angles or emit over an area. To select only exactly parallel rays by use of an infinitely small pinhole at a distance would in the mathematical limit of zero aperture diameter produce zero power. Thus all velocimeters intending to use practical white light sources must satisfy the superimposing condition, otherwise vanishingly little power can be utilized from them.

The image superimposing condition states that for each of a plurality of output rays generated by a given input ray, the ray position and angle must superimpose. That is, the multiple images created by an interferometer must superimpose longitudinally, transversely, and in magnitude. This creates an interferometer delay which is independent of ray angle passing through each pixel image and is preferred to be achromatic. When this condition is satisfied, the 3-dimensional interferometer behaves as a 1-dimensional interferometer, and the details concerning the imaging can be separated from the details concerning the temporal and spectral behavior of the velocimetry and range finding.

Embodiments of superimposing interferometers for light are shown in FIG. 18A–C. More embodiments of superimposing interferometers and a more detailed mathematical description of the temporal and spectral behavior of the velocimetry aspect of the invention are described in U.S. patent application Ser. No. 08/597,082. FIG. 18A shows an example of an interferometer of the prior art, called a Fabry-Perot, which does not satisfy the image superimposing requirement and therefore cannot be used with broadband sources that emit non-parallel light in this invention. The input ray 280 bounces between two partially reflecting mirrors 288 to produce several output rays 282, 284, 286 which are displaced translationally from each other, not superimposing.

FIG. 18B shows a recirculating interferometer which has the same temporal properties of the Fabry-Perot, but satisfies the image superimposing condition. The lens 272 images the surface of partially reflecting spherical mirror 274 to the other partially reflecting spherical mirror 276 with positive unity magnification. The lenses 278 focus approximately to the center of lens 272 so that collimated light applied to the system emerges as collimated. Mirror reflectivity of 66% would produce an approximate 3-tuplet impulse response, similar to 21 of FIG. 1C For an input pulse 280, the output rays 271, 273, 275 superimpose in position and angle.

FIG. 18C shows a two-path (called a Michelson) interferometer that satisfies the image superimposing condition. Lenses 260 and 262 form a relay system which images the spherical mirror 264 to the dashed plane 266. The dashed plane superimposes with the image of the plane mirror 268 of the other arm seen in the 50% beamsplitter 270. This will produce a pair impulse response shown at 20 in FIG. 1B.

In FIG. 17, the PZT 244 dithers the delay $\tau_2$ by half a fringe. The compensating delay $\tau_3$ (246) approximately equals $\tau_1$ so that a short pulse from the source will interfere with the inner pulses 33, 34 of FIG. 2E. The mirror 248 position and velocity compensates for the position and velocity of the target 250 so that path length from beamsplitter 252 to beamsplitter 254 for the inner two pulses 33, 34 changes little. Lenses in the delay 246 superimpose the image of the beamsplitter 252 to the beamsplitter 254. The two paths 256 and 258 emerging from beamsplitter 252 and recombining at beamsplitter 254 must form a superimposing two-path (Michelson) interferometer. That is, lenses 260 and 262 must cause an image located in the region near 252 to superimpose in the region near 254. The beamsplitter 254 is optionally misaligned slightly so that the cross-correlation delay varies across the beam. By recording the image of the beam by multi-channel cameras 264 and 266 the cross-correlation over a range of delays can be recorded promptly. A push-pull signal obtained by subtracting the complementary outputs yields the cross-correlation.

Figure 19:
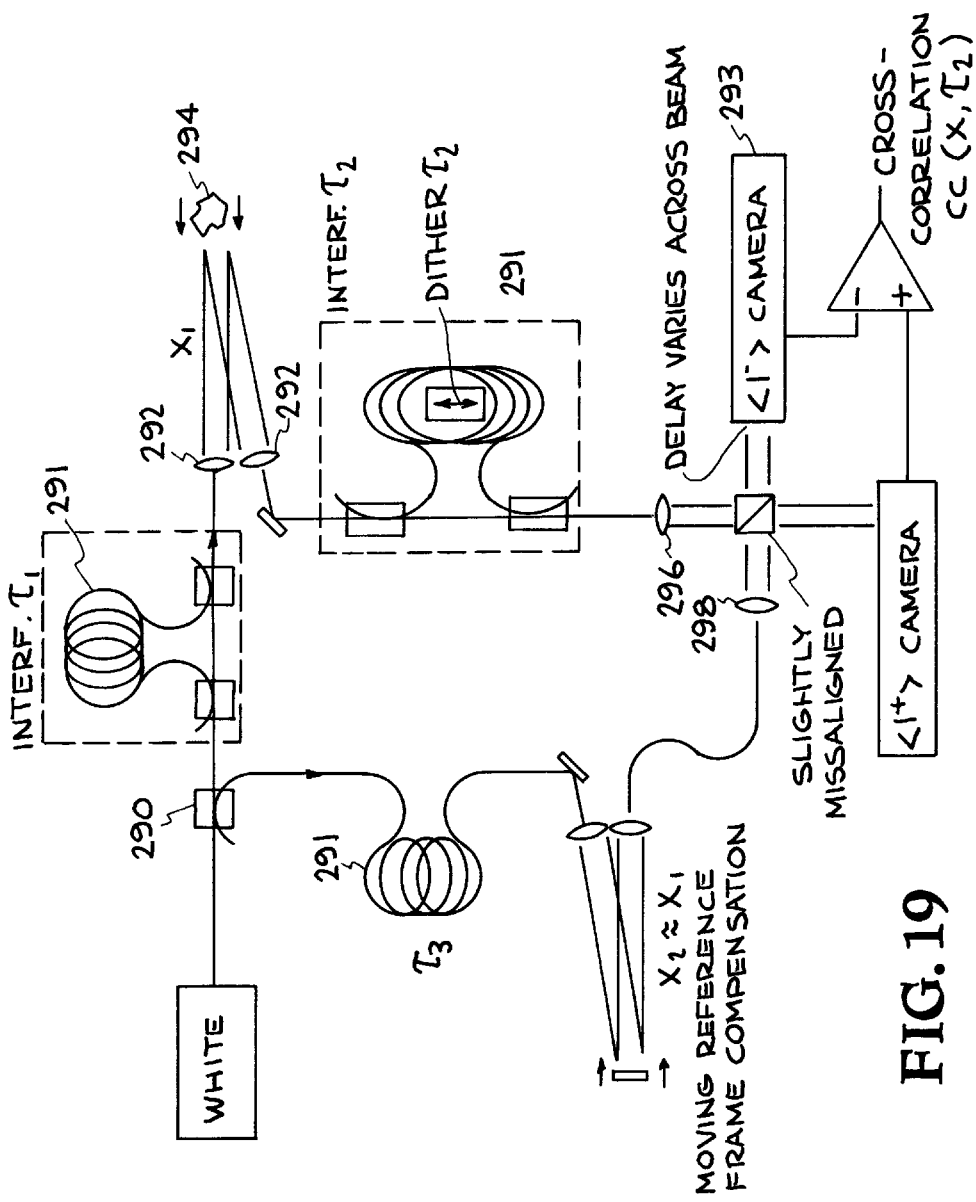
FIG. 19 shows a fiber-optical embodiment of the invention.

FIG. 19 shows an embodiment using single-mode optical fibers which is analogous to FIG. 17. The delays are accomplished by differing lengths of fibers, such as 291. The superimposing condition is moot because images are not propagated along the single-mode fiber. The beamsplitters of FIG. 17 are replaced by fiber-splitters 290, except for the final beamsplitter 254. This remains an open-beam beamsplitter so that it can be slightly misaligned and cause a delay between beams 296 and 298 which varies across the image at 293. This allows the cross-correlation to be recorded over a range of delays promptly. Lenses 292 at the fiber ends couple between 3-dimensional waves interacting with the target 294 to 1-dimensional signals in the fibers. The delay $\tau_2$ is dithered by some means such as straining the fiber spool so that the length changes by $<\lambda>/2$.

Changes and modifications in the specifically described embodiments can be carried out without departing from the scope of the invention, which is intended to be limited by the scope of the appended claims.

I claim:

1. An apparatus, comprising:
   a source for producing arbitrary waves;
   a first interferometer for imprinting a finite number of first coherent echos onto said arbitrary waves to produce imprinted waves, wherein said first interferometer has a first delay time;
   means for propagating said imprinted waves onto a target, wherein said imprinted waves are either transmitted through or reflected from said target to produce returned waves; and
   a second interferometer for imprinting a second finite number of second coherent echos onto said returned waves to produce a combined signal, wherein said second interferometer has a second delay time;
   wherein the velocity of said target may be calculated from the time averaged square of said combined signal.

2. The apparatus of claim 1, further comprising means for producing a velocity discriminated range value, wherein said means for producing a velocity discriminated range value comprises means for cross-correlating said combined signal with said arbitrary waves from said source before said imprinted waves are produced.

3. The apparatus of claim 1, wherein said arbitrary waves are non-repeating waves.

4. The apparatus of claim 1, wherein said arbitrary waves comprise wide bandwidth waves.

5. The apparatus of claim 1, wherein said arbitrary waves comprise waves which behave incoherently or randomly when said arbitrary waves are propagated onto said target.

6. The apparatus of claim 1, wherein said arbitrary waves comprise sets of narrowband waves having maximum and minimum frequency bands, wherein said maximum and minimum frequency bands are widely separated.

7. The apparatus of claim 1, wherein said arbitrary waves comprise narrowband waves whose instantaneous frequency changes significantly with time, continuously or discontinuously.

8. The apparatus of claim 1, wherein said arbitrary waves comprise waves whose smallest coherence time is less than or about equal to said first delay time.

9. The apparatus of claim 1, wherein said arbitrary waves comprise waves whose smallest coherence length is less than or about 20 times the change in round trip distance between said target and said apparatus during said first delay time.

10. The apparatus of claim 1, wherein said arbitrary waves comprise waves selected from a group consisting of waves whose smallest coherence time is less than or about equal to said first delay time and waves whose smallest coherence length is less than or about 20 times the change in round trip distance between said target and said apparatus during said first delay time, wherein said waves are non-repeating waves.

11. The apparatus of claim 1, wherein said arbitrary waves comprise waves selected from a group consisting of waves whose smallest coherence time is less than or about equal to said first delay time and waves whose smallest coherence length is less than or about 20 times the change in round trip distance between said target and said apparatus during said first delay time, wherein said waves are repeating waves.

12. The apparatus of claim 1, wherein said arbitrary waves comprise waves selected from a group consisting of waves whose smallest coherence time is less than or about equal to said first delay time and waves whose smallest coherence length is less than or about 20 times the change in round trip distance between said target and said apparatus during said first delay time, wherein said source comprises a noise source.

13. The apparatus of claim 1, wherein said arbitrary waves comprise waves selected from a group consisting of waves that have a smallest coherence time that is less than or about equal to said first delay time and waves that have a smallest coherence length that is less than or about 20 times the change in round trip distance between said target and said apparatus during said first delay time.

14. The apparatus of claim 1, wherein said first coherent echos and said second coherent echos comprises delayed and undelayed components.

15. The apparatus of claim 1, wherein said first coherent echos and said second coherent echos comprise a wave kind in the imprinting process that is any wave kind for which constructive or destructive interference occurs in the combined intensity in said first interferometer or said second interferometer when a delayed replica is combined with an undelayed wave.

16. The apparatus of claim 1, wherein said first coherent echos and said second coherent echos comprise a wave kind selected from a group consisting of an analog electrical signal, a numerical value, an analog signal including acoustic waves and a digital signal.

17. The apparatus of claim 1, wherein said first coherent echos and said second coherent echos comprise a wave kind that is heterodyned to a different average frequency, called the intermediate frequency (IF) signal, wherein said wave kind is split into several components which are individually heterodyned to a set of parallel IF signals which are individually imprinted and then recombined by a reverse heterodyning process.

18. The apparatus of claim 1, wherein said imprinted waves are converted to another wave kind by an antenna or transducer, wherein said wave kind comprises electromagnetic waves, and wherein said returned waves are dilated or contracted.

19. The apparatus of claim 1, further comprising an antenna or a transducer to convert said returned waves to a second wave kind before imprinting, wherein said second wave kind comprises delayed components and undelayed components that are coherently identical, wherein said delayed components and said undelayed components are separated by a delay t1.

20. The apparatus of claim 1, further comprising a wavelength dispersive device to disperse said combined signal into separate channels according to wavelength.

21. A method, comprising:

imprinting, with a first interferometer, a finite number of coherent echos onto a wide bandwidth source of waves to produce imprinted waves;

propagating said imprinted waves onto a target, wherein said imprinted waves are either transmitted through or reflected from said target to produce returned waves;

imprinting, with a second interferometer, a finite number of coherent echos onto said returned waves to produce a combined signal; and time averaging the square of said combined signal to calculate the velocity of said target.

22. The method of claim 21, further comprising producing a velocity discriminated range value and cross-correlating said combined signal with wide bandwidth waves from said wide bandwidth source before said imprinted waves are produced.

23. The method of claim 21, further comprising:

delaying a portion of said wide bandwidth signal by a time t3 to produce a moving reference frame signal, wherein t3 is slewed to anticipate a moving target; and crosscorrelating said combined signal with said moving reference frame signal to produce a crosscorrelated signal, wherein the amplitude of said crosscorrelated signal is interpreted into the probability of the presence of a target at a range set by t3 having a velocity set by a difference in a delay time of said first interferometer from a delay time of said second interferometer.

24. The method of claim 23, wherein the step of cross-correlating is produced by summing said combined signal with said moving reference frame signal to produce an intermediate signal and time averaging the square of said intermediate signal to produce said crosscorrelated signal.

25. The method of claim 23, wherein the step of cross-correlating is produced by numerically manipulating said combined signal with said moving reference frame signal by multiplying the Fourier transform of said combined signal with the Fourier transform of said moving reference frame signal.

26. An apparatus, comprising:

a source for producing arbitrary waves;

a first interferometer for producing from said arbitrary waves an output waveform and at least one delayed coherent replica of said output waveform, wherein the sum of said output waveform and said at least one delayed coherent replica is called first imprinted waves;

means for propagating said first imprinted waves onto a target, wherein said first imprinted waves interact with said target by transmission or reflection to produce returning waves, wherein motion of said target and change in refractive index of said target cause said returning waves to dilate or contract to produce dilated waves;

means for collecting said returning said dilated waves to produce collected dilated waves; and a second interferometer for producing from said collected dilated waves a second output waveform and at least one delayed coherent replica of said second output waveform, wherein the sum of said second output waveform and said at least one delayed replica of said second output waveform is called second imprinted waves, wherein an effective target velocity of said target may be calculated by time averaging the square of said second imprinted waves to yield an average power of said second imprinted waves, wherein variations in said average power with said collected dilated waves are called fringes, wherein said effective target velocity is calculated from the phase shift of said fringes.

* * * * *